United States Patent
Jin et al.

(10) Patent No.: US 11,863,252 B2
(45) Date of Patent: *Jan. 2, 2024

(54) TERMINAL DEVICE CAPABILITY TRANSMISSION METHOD, APPARATUS, AND SYSTEM

(71) Applicant: HUAWEI TECHNOLOGIES CO., LTD., Guangdong (CN)

(72) Inventors: Huangping Jin, Shanghai (CN); Ruiqi Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/968,218

(22) Filed: Oct. 18, 2022

(65) Prior Publication Data

US 2023/0044464 A1    Feb. 9, 2023

Related U.S. Application Data

(63) Continuation of application No. 16/371,858, filed on Apr. 1, 2019, now Pat. No. 11,509,360, which is a (Continued)

(30) Foreign Application Priority Data

Jan. 12, 2018    (CN) .................. 201810032046.X

(51) Int. Cl.
*H04B 7/0417*    (2017.01)
*H04B 7/06*    (2006.01)
(Continued)

(52) U.S. Cl.
CPC ............. *H04B 7/0417* (2013.01); *G06N 3/08* (2013.01); *G06T 7/73* (2017.01); *G06V 10/462* (2022.01);
(Continued)

(58) Field of Classification Search
CPC .. H04B 7/0417; H04B 7/0626; H04B 7/0628; H04W 72/51; H04W 72/0446;
(Continued)

(56) References Cited

U.S. PATENT DOCUMENTS

2013/0039349 A1    2/2013    Ebrahimi Tazeh Mahalleh et al.
2013/0083681 A1    4/2013    Ebrahimi Tazeh Mahalleh et al.
(Continued)

FOREIGN PATENT DOCUMENTS

CN    101624494    1/2010
CN    101702632    5/2010
(Continued)

OTHER PUBLICATIONS

3GPP TS 36.213 V14.5.0, "3rd Generation Partnership Project; Technical Specification Group Radio Access Network; Evolved Universal Terrestrial Radio Access (E-UTRA); Physical layer procedures (Release 14)," Dec. 2017, 462 pages.
(Continued)

*Primary Examiner* — Phong La
(74) *Attorney, Agent, or Firm* — Fish & Richardson P.C.

(57) ABSTRACT

Embodiments of this application disclose terminal device capability transmission methods, apparatuses, and systems. In an implementation, a terminal device transmits capability information to a network device, the capability information indicates a maximum quantity of ports of reference signals for channel state information (CSI) measurement supported by a terminal device in a time-domain unit, wherein the time-domain unit is one slot, and the capability information is determined based on a capability of the terminal device.

32 Claims, 8 Drawing Sheets

Related U.S. Application Data continuation of application No. PCT/CN2018/093415, filed on Jun. 28, 2018.

(51) Int. Cl.

| | |
|---|---|
| *H04W 72/0446* | (2023.01) |
| *H04L 5/00* | (2006.01) |
| *H04W 72/51* | (2023.01) |
| *G06T 7/73* | (2017.01) |
| *G06V 10/46* | (2022.01) |
| *G06V 40/10* | (2022.01) |
| *G06N 3/08* | (2023.01) |

(52) U.S. Cl.
CPC ......... *G06V 40/103* (2022.01); *H04B 7/0626* (2013.01); *H04B 7/0628* (2013.01); *H04L 5/0048* (2013.01); *H04W 72/0446* (2013.01); *H04W 72/51* (2023.01); *G06T 2207/30196* (2013.01); *G06T 2210/12* (2013.01)

(58) Field of Classification Search
CPC ............. H04L 5/0048; G06T 7/73; G06T 2207/30196; G06T 2210/12; G06V 10/462; G06V 40/103; G06N 3/08
See application file for complete search history.

(56) References Cited

U.S. PATENT DOCUMENTS

| | | |
|---|---|---|
| 2014/0369291 A1 | 12/2014 | Zhang et al. |
| 2015/0063287 A1 | 3/2015 | Mazzarese et al. |
| 2015/0124638 A1 | 5/2015 | Sun et al. |
| 2015/0180684 A1 | 6/2015 | Chen et al. |
| 2015/0318972 A1 | 11/2015 | Zhang et al. |
| 2016/0013906 A1 | 1/2016 | Guo et al. |
| 2016/0156401 A1 | 6/2016 | Onggosanusi |
| 2016/0212643 A1 | 7/2016 | Park |
| 2016/0269089 A1 | 9/2016 | Liu et al. |
| 2016/0294454 A1 | 10/2016 | Onggosanusi et al. |
| 2016/0337874 A1 | 11/2016 | Yang et al. |
| 2016/0359538 A1 | 12/2016 | Onggosanusi et al. |
| 2017/0078065 A1 | 3/2017 | Nam et al. |
| 2017/0150491 A1 | 5/2017 | Lin et al. |
| 2017/0180194 A1 | 6/2017 | Noh et al. |
| 2017/0264405 A1 | 9/2017 | Gao et al. |
| 2018/0102817 A1* | 4/2018 | Park .......... H04B 7/06 |
| 2018/0115357 A1 | 4/2018 | Park |
| 2018/0123654 A1* | 5/2018 | Park ........ H04L 5/0057 |
| 2018/0145737 A1 | 5/2018 | Rahman |
| 2018/0183503 A1* | 6/2018 | Rahman ........... H04W 72/23 |
| 2018/0254814 A1 | 9/2018 | Park |
| 2018/0262251 A1 | 9/2018 | Kim |
| 2018/0262253 A1 | 9/2018 | Rahman |
| 2018/0309558 A1 | 10/2018 | Tong et al. |
| 2018/0323934 A1 | 11/2018 | Suzuki et al. |
| 2019/0081679 A1 | 3/2019 | Davydov et al. |
| 2019/0109679 A1 | 4/2019 | Liu et al. |
| 2019/0141742 A1 | 5/2019 | Zhou |
| 2019/0159219 A1 | 5/2019 | Hosseini |
| 2019/0174483 A1 | 6/2019 | Tsai |
| 2019/0199420 A1 | 6/2019 | Faxr et al. |
| 2019/0207737 A1 | 7/2019 | Babaei et al. |
| 2019/0215781 A1 | 7/2019 | Jeon |
| 2019/0222282 A1 | 7/2019 | Tsai |
| 2019/0273544 A1 | 9/2019 | Cha et al. |
| 2019/0312614 A1* | 10/2019 | Kim .............. H04B 7/0689 |
| 2020/0015228 A1 | 1/2020 | Kang et al. |
| 2020/0036424 A1 | 1/2020 | Kang |
| 2020/0044802 A1 | 2/2020 | Park et al. |
| 2020/0112355 A1 | 4/2020 | Park et al. |

FOREIGN PATENT DOCUMENTS

| | | |
|---|---|---|
| CN | 102546110 | 7/2012 |
| CN | 102624494 | 8/2012 |
| CN | 102625355 | 8/2012 |
| CN | 103391576 | 11/2013 |
| CN | 103428749 A | 12/2013 |
| CN | 103636253 | 3/2014 |
| CN | 105228218 | 1/2016 |
| CN | 107277918 | 10/2017 |
| CN | 107431515 | 12/2017 |
| CN | 107466446 | 12/2017 |
| CN | 107534540 | 1/2018 |
| CN | 107534540 A | 1/2018 |
| CN | 104509186 | 5/2018 |
| EP | 2874451 | 5/2015 |
| WO | 2014067139 | 5/2014 |
| WO | 2014198207 | 12/2014 |
| WO | 2016019581 | 2/2016 |
| WO | 2016163841 | 10/2016 |
| WO | 2017048048 | 3/2017 |
| WO | 2017082028 | 5/2017 |
| WO | 2017146485 | 8/2017 |

OTHER PUBLICATIONS

3GPP TS 38.214 V15.0.0, "3rd Generation Partnership Project; Technical Specification Group Radio Access Network; NR; Physical layer procedures for data (Release 15)," Dec. 2017, 71 pages.
3GPP TS 38.331 V15.0.0, "3rd Generation Partnership Project; Technical Specification Group Radio Access Network NR Radio Resource Control (RRC) protocol specification(Release 15)," Dec. 2017, 188 pages.
Chinese Notice of Allowance issued in Chinese Application No. 201810737536X dated Feb. 22, 2019, 4 pages.
Chinese Office Action issued in Chinese Application No. 201810737536.x dated Nov. 26, 2018, 7 pages.
Chinese Office Action issued in Chinese Application No. 201810739575.3 dated Feb. 11, 2019, 4 pages.
Chinese Search Report issued in Chinese Application No. 2018107395753 dated Jan. 29, 2019, 2 pages.
Ericsson, "NR CSI Computation Capability," 3GPP TSG RAN WG1 Meeting #89, R1-1708696, Hangzhou, P.R. China, May 15-19, 2017, 3 pages.
Extended European Search Report issued in European Application No. 18759228.2 dated Nov. 11, 2019, 11 pages.
International Search Report and Written Opinion issued in International Application No. PCT /CN2018/093415 dated Sep. 29, 2018, 8 pages.
Issue Notification issued in Chinese Application No. 201810739575.3 dated Apr. 9, 2019, 3 pages.
Notice of Allowance issued in Chinese Application No. 201810739575.3 dated Apr. 9, 2019, 1 page.
NTT Docomo, "[draft] R1-172xxxx RAN1 UE feature list on Rel-15 NR_MIMO v9," AT&T discussion RAN1# 91, R1-1721707, Nov. 27, 2017, Reno, Nevada, US, 9 pages.
NTT Docomo, "Revision of R1-1721438 RAN1 UE feature list on Rel-15 NR_v3," AT&T discussion RAN1#91, R1-1721707, Nov. 27, 2017, Reno, Nevada, US, 13 pages.
Samsung, "CSI reporting and UCI multiplexing," 3GPP TSG RAN WG1 Meeting #91, R1-1720289, Reno, USA, Nov. 27-Dec. 1, 2017, 3 pages.
Office Action issued Indian Application No. 201937046195 dated Apr. 15, 2021, 6 pages.
Office Action issued in Chinese Application No. 201880083075.7 dated Apr. 27, 2021, 10 pages.
Office Action issued in Chinese Application No. 201910396567.8 dated Feb. 3, 2021, 9 pages (with English translation).
Office Action issued in U.S. Appl. No. 16/434,556 dated Jul. 23, 2019, 1 page.
Intel Corporation, "Discussion on Interference Measurement for CSI," 3GPP TSG-RAN WG1 Meeting #90, R1-1712545, Prague, P.R. Czech, Aug. 21-25, 2017, 11 pages.
Office Action in Chinese Appln. No. 201810032046.X, dated Apr. 22, 2023, 5 pages.

* cited by examiner

TERMINAL DEVICE CAPABILITY TRANSMISSION METHOD, APPARATUS, AND SYSTEM

CROSS-REFERENCE TO RELATED APPLICATIONS

This application is a continuation of U.S. patent application Ser. No. 16/371,858, filed on Apr. 1, 2019, which is a continuation of International Application No. PCT/CN2018/093415, filed on Jun. 28, 2018, which claims priority to Chinese Patent Application No. 201810032046.X, filed on Jan. 12, 2018. All of the afore-mentioned patent applications are hereby incorporated by reference in their entireties.

TECHNICAL FIELD

This application relates to the field of communications technologies, and more specifically, to a terminal device capability transmission technology in a communications system.

BACKGROUND

Next-generation mobile communications systems require large-capacity high-quality data transmission. A massive multi-input multi-output (Massive MIMO) technology is considered as one of key technologies that can implement future high-speed data transmission. The technology significantly improves spectral efficiency by using massive antennas. Accuracy of channel state information (CSI) that can be obtained by a base station determines massive MIMO performance to a large extent. The channel state information (CSI) is obtained and reported by user equipment (UE) by measuring a downlink transmission channel and quantizing a measurement result, so that the base station can obtain a channel status and an interference status in downlink transmission.

For CSI measurement and result reporting, the base station needs to pre-configure corresponding CSI measurement and reporting parameters based on a CSI reporting capability of the UE. In several releases such as R11, R12, and R13 in a Long Term Evolution (LTE) communications system, the CSI reporting capability of the UE is defined as a quantity, reported by the UE, of CSI processes that can be processed by the UE. New Radio (NR) defines a set of flexible CSI configuration frameworks. When CSI measurement is to be performed, the base station configures one measurement setting, one or more reporting settings, and one or more resource settings. Each measurement setting includes one or more links. Each link is used to connect one reporting setting and one resource setting, and indicate whether the link is used for channel measurement or interference measurement. Each reporting setting includes content of CSI reporting and occupied time-domain and frequency-domain resource locations. Each resource setting includes time-domain and frequency-domain resource locations occupied by a reference signal (RS) resource used for CSI measurement. Currently, a potential manner described in NR is to define the CSI reporting capability of the UE as a quantity, reported by the UE, of reporting settings that can be processed by the UE.

However, because the CSI process and the reporting setting each have many configurations, the UE can estimate a reporting capability based only on a worst case (that is, a most calculation-consuming case). Therefore, regardless of the quantity of CSI processes or the quantity of reporting settings, an actual calculation capability of the UE in terms of CSI reporting cannot be represented, and a degree of freedom in CSI measurement and reporting is restricted.

SUMMARY

This application provides a terminal device capability transmission method, apparatus, and system, so that a network side can learn an actual CSI reporting capability of a terminal device through transferring of capability information that represents a more actual calculation capability of the terminal device in terms of CSI reporting, thereby effectively and flexibly performing CSI measurement related configuration.

According to a first aspect, a terminal device capability reporting method and apparatus are provided.

In a possible design, the method is applied to a terminal device. A network side can obtain an actual CSI reporting capability of the terminal device through reporting of capability information that represents a more actual calculation capability of the terminal device in terms of CSI reporting. The method includes: The terminal device sends the capability information of the terminal device to a network device (it may be understood that the network device includes an access node, a transmission and reception point having some functions of the access node, and the like). The capability information is used to indicate a channel state information (CSI) reporting capability of the terminal device. It may be understood that before sending the capability information, the terminal device first generates the capability information. The capability information is used to enable the network device receiving the information to learn the CSI reporting capability of the terminal device, thereby determining a CSI measurement configuration of the terminal device. The capability information is associated with a quantity, supported by the terminal device in at least one time-domain unit, of ports of pilots used for CSI measurement. After establishing a connection to the network device, the terminal device reports the capability information. After the network device determines a capability that is of the terminal device and is associated with the quantity, supported by the terminal device in the at least one time-domain unit, of ports of the pilots used for CSI measurement, the CSI measurement configuration may be considered based on the capability in combination with a status of the network device and/or the terminal device. For example, a configuration of the pilot used for CSI measurement cannot exceed a processing capability of the terminal device, the terminal device can complete processing of corresponding CSI measurement when needing to perform reporting, and can perform reporting, and a time for configuring or triggering the terminal device to perform reporting is appropriate.

In this design, the terminal device reports the capability information, where the capability information can reflect the actual CSI reporting capability of the terminal device and is associated with the quantity, supported by the terminal device in the at least one time-domain unit, of ports of the pilots used for CSI measurement, so that the network device can learn the actual CSI reporting capability of the terminal device, thereby effectively and flexibly configuring CSI measurement and reporting of the terminal device.

Correspondingly, the terminal device capability reporting apparatus is provided. The apparatus can implement the corresponding reporting method according to the first aspect. For example, the apparatus is limited in a functional form, and may be an entity on a terminal side. A specific implementation of the apparatus may be a terminal device.

For example, the apparatus may be a terminal device, or a chip or a function module in a terminal device. The method may be implemented by software or hardware, or by hardware executing corresponding software.

In a possible design, the apparatus may include a processor and a memory. The processor is configured to support the apparatus in executing a corresponding function in the method according to the first aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to send the capability information to the network device. Optionally, the apparatus may further include a processing unit. The processing unit is configured to generate the capability information to be sent.

According to a second aspect, a terminal device capability obtaining method and apparatus are provided.

In a possible design, the method is applied to a network device, for example, an access node, or a transmission and reception point having some functions of an access node on a network side. The network device obtains capability information that is reported by a terminal device and that represents a more actual calculation capability of the terminal device in terms of CSI reporting, so that the network device obtains an actual CSI reporting capability of the terminal device, thereby determining a subsequent CSI measurement related configuration. The method includes: The network device receives the capability information sent by the terminal device. The capability information is used to indicate a channel state information (CSI) reporting capability of the terminal device. It may be understood that the capability information is used to enable the network device receiving the information to learn the CSI reporting capability of the terminal device, thereby determining a CSI measurement configuration of the terminal device. The capability information is associated with a quantity, supported by the terminal device in at least one time-domain unit, of ports of pilots used for CSI measurement. After establishing a connection to the network device, the terminal device reports the capability information. After the network device determines a capability that is of the terminal device and is associated with the quantity, supported by the terminal device in the at least one time-domain unit, of ports of the pilots used for CSI measurement, the CSI measurement configuration may be considered based on the capability in combination with a status of the network device and/or the terminal device. For example, a configuration of the pilot used for CSI measurement cannot exceed a processing capability of the terminal device, the terminal device can complete processing of corresponding CSI measurement when needing to perform reporting, and can perform reporting, and a time for configuring or triggering the terminal device to perform reporting is appropriate.

In this design, the network device receives the capability information reported by the terminal device, where the capability information can reflect the actual CSI reporting capability of the terminal device and is associated with the quantity, supported by the terminal device in the at least one time-domain unit, of ports of the pilots used for CSI measurement, so that the network device can learn the actual CSI reporting capability of the terminal device, thereby effectively and flexibly configuring CSI measurement and reporting of the terminal device.

Correspondingly, the terminal device capability obtaining apparatus is provided. The apparatus can implement the corresponding obtaining method according to the second aspect. For example, the apparatus is limited in a functional form, and may be an entity on an access side. A specific implementation of the apparatus may be an access node device. For example, the apparatus may be an access node device, or a chip or a function module in an access node device. The method may be implemented by software or hardware, or by hardware executing corresponding software.

In a possible design, the apparatus may include a processor and a memory. The processor is configured to support the apparatus in executing a corresponding function in the method according to the second aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to receive the capability information sent by the terminal device. Optionally, the apparatus may further include a processing unit. The processing unit is configured to determine the CSI measurement configuration of the terminal device.

In either technical solution provided in the first aspect and the second aspect, optionally, the capability information can be indicated by using a bit in a bitmap or by using a value of an indication field. The quantity of ports of the pilots used for CSI measurement may include at least one of the following: a quantity of ports of pilots used for channel measurement, a sum of the quantity of ports of the pilots used for channel measurement and a quantity of ports of pilots used for interference measurement, and a weighted sum of the quantity of ports of the pilots used for channel measurement and the quantity of ports of the pilots used for interference measurement.

Based on either technical solution provided in the first aspect and the second aspect, in a possible design, the capability information includes at least one of the following: information about the quantity, supported in the at least one time-domain unit, of the ports of the pilots used for CSI measurement; and information about a quantity of time-domain units required for supporting a predetermined quantity of ports of the pilots used for CSI measurement (namely, information about a quantity of time-domain units required for calculating a calculation amount corresponding to the predetermined quantity of ports). Optionally, the predetermined quantity of ports may be determined according to different settings or policies. For example, the predetermined quantity of ports includes at least one of the following: a preset minimum configurable quantity of ports that is supported by the terminal device, a preset maximum configurable quantity of ports that is supported by the terminal device, and a quantity of ports that is determined according to a predetermined configuration criterion.

A quantity, supported in one time-domain unit, of ports of pilots used for CSI measurement can be determined by using the predetermined quantity of ports of the pilots used for CSI measurement and the quantity of required time-domain units. Alternatively, the quantity of required time-domain units can be determined by using the predetermined quantity of ports of the pilots used for CSI measurement and a quantity, supported in one time-domain unit, of ports of pilots used for CSI measurement. Optionally, the information about the quantity, supported in the at least one time-domain unit, of ports of the pilots used for CSI measurement includes information about a maximum quantity, supported in the at least one time-domain unit, of ports of the pilots used for CSI measurement, and the information about the quantity of time-domain units required for supporting the predetermined quantity of ports of the pilots used for CSI measurement includes information about a minimum quantity of time-domain units required for supporting the predetermined quantity of ports of the pilots used for CSI measurement. The supported maximum quantity of ports and the minimum quantity of required time-domain units reflect a maximum limit to the CSI reporting capability of the terminal device.

Based on either technical solution provided in the first aspect and the second aspect, in a possible design, the time-domain unit may include at least one of the following division types: n time-domain symbols, n mini-slots, n slots, n subframes, and n frames, where n is greater than or equal to 1. For example, when the division type is n symbols and n=1, the capability information is associated with a quantity, supported by the terminal device in one symbol, of ports of the pilots used for CSI measurement. For example, a quantity, supported in one symbol, of ports of the pilots used for CSI measurement, a quantity of symbols required for supporting a predetermined quantity of ports of the pilots used for CSI measurement. In this design, the CSI reporting capability of the terminal device may be determined based on different calculation amounts and time granularities.

It may be understood that if the terminal device supports a plurality of division types of the time-domain unit, the terminal device may select a division type used by the terminal device to measure the CSI reporting capability of the terminal device, and then send, to the network device, first indication information indicating the division type of the time-domain unit. The first indication information and the capability information may be sent separately or together. Optionally, a division type may be specified by the network device. The terminal device receives, before generating the capability information to be sent, second indication information that indicates a division type and that is sent by the network device. The CSI reporting capability of the terminal device may be flexibly defined based on an indication of the division types.

Based on either technical solution provided in the first aspect and the second aspect, in a possible design, when the CSI reporting capability is further associated with a calculation capability category of the terminal device, the capability information includes the information about the quantity of time-domain units required for supporting the predetermined quantity of ports of the pilots used for CSI measurement. Optionally, if the calculation capability category includes that the terminal device does not have a plurality of parallel calculation channels for a CSI measurement reporting setting and the at least one time-domain unit supports calculation of one reporting setting, the capability information includes the information about the quantity of time-domain units required for supporting the predetermined quantity of ports of the pilots used for CSI measurement. Optionally, if the calculation capability category includes that the terminal device has a plurality of parallel calculation channels for a CSI measurement reporting setting and one parallel calculation channel corresponds to calculation of one reporting setting, the capability information includes the information about the quantity of time-domain units required for supporting the predetermined quantity of ports of the pilots used for CSI measurement and a quantity of the parallel calculation channels. Optionally, if the calculation capability category includes that the terminal device has a plurality of parallel calculation channels for a CSI measurement reporting setting and the plurality of parallel calculation channels correspond to parallel calculation of one reporting setting, the capability information includes the information about the quantity of time-domain units required for supporting the predetermined quantity of ports of the pilots used for CSI measurement.

It may be understood that if the terminal device supports at least two calculation capability categories, the terminal device may select a calculation capability category used by the terminal device to measure the CSI reporting capability of the terminal device, and then send, to the network device, third indication information indicating the calculation capability category. The third indication information and the capability information may be sent separately or together. Optionally, a calculation capability category may be specified by the network device. The terminal device receives, before generating the capability information to be sent, fourth indication information that indicates the calculation capability category and that is sent by the network device. The CSI reporting capability of the terminal device may be flexibly defined based on a calculation capability category selection indication.

Based on either technical solution provided in the first aspect and the second aspect, in a possible design, the CSI reporting capability may be distinguished for different CSI measurement types, or may not be distinguished. Optionally, if the CSI reporting capability is for different CSI measurement types, the capability information includes at least one capability information, which indicates at least one CSI reporting capability corresponding to different CSI measurement types. Optionally, if the CSI reporting capability is not for different CSI measurement types, the capability information indicates a CSI reporting capability corresponding to a predetermined type in different CSI measurement types. To consider a most conservative case (that is, a most calculation-consuming case is considered to avoid that the capability of the terminal device is exceeded), the predetermined type is a maximum complexity type. Optionally, the different CSI measurement types include at least one of the following: different codebook types, different precoding matrix indicator (PMI) types, and different bandwidth part (BWP) sizes. In this design, the CSI reporting capability of the terminal device can be more finely distinguished.

In either technical solution provided in the first aspect and the second aspect, after the terminal device reports the capability information to the network device, the network device sends, to the terminal device after determining a configuration, a CSI measurement related parameter configured based on the capability information. The terminal device receives the CSI measurement related parameter that is sent by the network device and that is configured based on the capability information. Optionally, the related parameter includes at least one of the following: a quantity of reporting settings, a quantity of resource settings, a quantity of CSI pilot resource settings included in each resource set, a quantity of CSI pilot resources included in each resource set, a quantity of ports of a CSI pilot included in each resource set, a periodically reported period, and an aperiodically reported time offset, where the time offset is a time interval from CSI reporting triggering to CSI reporting.

According to a third aspect, a terminal device capability reporting method and apparatus are provided.

In a possible design, the method is applied to a terminal device. A CSI reporting capability of the terminal device is distinguished for different CSI measurement types, so that a network side obtains a more targeted CSI reporting capability of the terminal device. The method includes: The terminal device sends at least two pieces of capability information of the terminal device to a network device (it may be understood that the network device includes an access node, a transmission and reception point having some functions of an access node, and the like). The at least two pieces of capability information are respectively used to indicate CSI reporting capabilities of the terminal device that correspond to different CSI measurement types. It may be understood that before sending the at least two pieces of capability information, the terminal device first generates the capability information. The at least two pieces of capability information may be sent together or separately. It may be understood that the capability information is used to enable the network device receiving the information to learn the CSI reporting capability of the terminal device, thereby determining a CSI measurement configuration of the terminal device in a case of the different CSI measurement types. Optionally, the different CSI measurement types include at least one of the following: different codebook types, different precoding matrix indicator (PMI) types, and different bandwidth part (BWP) sizes.

In this design, the CSI reporting capability of the terminal device can be more finely distinguished based on the different CSI measurement types, so that the network device determines a more targeted CSI measurement related configuration of the terminal device.

In a possible design, the related definition in the first aspect or the second aspect may be used for the at least two pieces of capability information. To be specific, the capability information is associated with a quantity, supported by the terminal device in at least one time-domain unit, of ports of pilots used for CSI measurement.

Correspondingly, the terminal device capability reporting apparatus is provided. The apparatus can implement the corresponding reporting method according to the third aspect. For example, the apparatus is limited in a functional form, and may be an entity on a terminal side. A specific implementation of the apparatus may be a terminal device. For example, the apparatus may be a terminal device, or a chip or a function module in a terminal device. The method may be implemented by software or hardware, or by hardware executing corresponding software.

In a possible design, the apparatus may include a processor and a memory. The processor is configured to support the apparatus in executing a corresponding function in the method according to the third aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to send the at least two pieces of capability information to the network device. Optionally, the apparatus may further include a processing unit. The processing unit is configured to generate the at least two pieces of capability information to be sent.

According to a fourth aspect, a terminal device capability obtaining method and apparatus are provided.

In a possible design, the method is applied to a network device, for example, an access node, or a transmission and reception point having some functions of an access node on a network side. A CSI reporting capability of a terminal device is distinguished for different CSI measurement types, so that the network device obtains a more targeted CSI reporting capability of the terminal device, thereby configuring CSI measurement of the terminal device in a more targeted manner. The method includes: The network device receives at least two pieces of capability information sent by the terminal device. The at least two pieces of capability information are respectively used to indicate CSI reporting capabilities of the terminal device that correspond to different CSI measurement types. It may be understood that the capability information is used to enable the network device to learn the CSI reporting capability of the terminal device, thereby determining a CSI measurement configuration of the terminal device in a case of the different CSI measurement types. It may be understood that the at least two pieces of capability information may be sent together or separately. Optionally, the different CSI measurement types include at least one of the following: different codebook types, different precoding matrix indicator (PMI) types, and different bandwidth part (BWP) sizes.

In this design, the CSI reporting capability of the terminal device can be more finely distinguished based on the different CSI measurement types, so that the network device determines a more targeted CSI measurement related configuration of the terminal device.

In a possible design, the related definition in the first aspect or the second aspect may be used for the at least two pieces of capability information. That is, the capability information is associated with a quantity, supported by the terminal device in at least one time-domain unit, of ports of pilots used for CSI measurement.

Correspondingly, the terminal device capability obtaining apparatus is provided. The apparatus can implement the corresponding obtaining method according to the fourth aspect. For example, the apparatus is limited in a functional form, and may be an entity on an access side. A specific implementation of the apparatus may be an access node device. For example, the apparatus may be an access node device, or a chip or a function module in an access node device. The method may be implemented by software or hardware, or by hardware executing corresponding software.

In a possible design, the apparatus may include a processor and a memory. The processor is configured to support the apparatus in executing a corresponding function in the method according to the fourth aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to receive the at least two pieces of capability information sent by the terminal device. Optionally, the apparatus may further include a processing unit. The processing unit is configured to determine the CSI measurement configuration of the terminal device.

According to a fifth aspect, a terminal device capability reporting method and apparatus are provided.

In a possible design, the method is applied to a terminal device. A CSI reporting capability of the terminal device may be flexibly defined by providing different definition type selections for the CSI reporting capability of the terminal device. A network device may perform configuration in different granularities for different terminal devices. The method includes: The terminal device sends selection indication information to the network device (it may be understood that the network device includes an access node, a transmission and reception point having some functions of an access node, and the like), or the terminal device receives selection indication information sent by the network device. The selection indication information is used to indicate a CSI reporting capability definition type of the terminal device. It may be understood that when the CSI reporting capability of the terminal device may have a plurality of definition types, before generating capability information indicating the CSI reporting capability, the terminal device first autonomously selects a CSI reporting capability definition type or determines a CSI reporting capability definition type based on an indication on a network side.

Optionally, the definition type may be the division type of the time-domain unit in a definition of the CSI reporting capability in the first aspect or the second aspect, a type of the calculation capability category of the terminal device described above, or another definition type.

In this design, the CSI reporting capability of the terminal device may be flexibly defined by providing different definition type selections for the CSI reporting capability of the terminal device. The network device may perform configuration in different granularities for different terminal devices.

In a possible design, the related definition in the first aspect or the second aspect may be used for the capability information. That is, the capability information is associated with a quantity, supported by the terminal device in at least one time-domain unit, of ports of pilots used for CSI measurement.

Correspondingly, the terminal device capability reporting apparatus is provided. The apparatus can implement the corresponding reporting method according to the fifth aspect. For example, the apparatus is limited in a functional form, and may be an entity on a terminal side. A specific implementation of the apparatus may be a terminal device. For example, the apparatus may be a terminal device, or a chip or a function module in a terminal device. The method may be implemented by software or hardware, or by hardware executing corresponding software.

In a possible design, the apparatus may include a processor and a memory. The processor is configured to support the apparatus in executing a corresponding function in the method according to the fifth aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to send the selection indication information to the network device or receive the selection indication information sent by the network device. Optionally, the apparatus may further include a processing unit. The processing unit is configured to generate the selection indication information to be sent.

According to a sixth aspect, a terminal device capability obtaining method and apparatus are provided.

In a possible design, the method is applied to a network device, for example, an access node, or a transmission and reception point having some functions of an access node on a network side. A CSI reporting capability of a terminal device may be flexibly defined by providing different definition type selections for the CSI reporting capability of the terminal device. The network device may perform configuration in different granularities for different terminal devices. The method includes: The network device sends selection indication information to the terminal device, or the network device receives selection indication information sent by the terminal device. The selection indication information is used to indicate a CSI reporting capability definition type of the terminal device. It may be understood that when the CSI reporting capability of the terminal device may have a plurality of definition types, before generating capability information indicating the CSI reporting capability, the terminal device first autonomously selects a CSI reporting capability definition type or determines a CSI reporting capability definition type based on an indication on a network side.

Optionally, the definition type may be the division type of the time-domain unit in a definition of the CSI reporting capability in the first aspect or the second aspect, a type of the calculation capability category of the terminal device described above, or another definition type.

In this design, the CSI reporting capability of the terminal device may be flexibly defined by providing different definition type selections for the CSI reporting capability of the terminal device. The network device may perform configuration in different granularities for different terminal devices.

In a possible design, the related definition in the first aspect or the second aspect may be used for the capability information. That is, the capability information is associated with a quantity, supported by the terminal device in at least one time-domain unit, of ports of pilots used for CSI measurement.

Correspondingly, the terminal device capability obtaining apparatus is provided. The apparatus can implement the corresponding obtaining method according to the sixth aspect. For example, the apparatus is limited in a functional form, and may be an entity on an access side. A specific implementation of the apparatus may be an access node device. For example, the apparatus may be an access node device, or a chip or a function module in an access node device. The method may be implemented by software or hardware, or by hardware executing corresponding software.

In a possible design, the apparatus may include a processor and a memory. The processor is configured to support the apparatus in executing a corresponding function in the method according to the sixth aspect. The memory is configured to couple to the processor. The memory stores a program (instruction) and data necessary for the apparatus. In addition, the apparatus may further include a communications interface, configured to support communication between the apparatus and another network element. The communications interface may be a transceiver.

In a possible design, the apparatus may include a transceiver unit. The transceiver unit is configured to send the selection indication information to the terminal device or receive the selection indication information sent by the terminal device. Optionally, the apparatus may further include a processing unit. The processing unit is configured to determine the CSI measurement configuration of the terminal device.

This application further provides a computer storage medium, storing a computer program (instruction). When the program (instruction) runs on a computer, the computer performs the method according to any one of the foregoing aspects.

This application further provides a computer program product. When the computer program product runs on a computer, the computer performs the method according to any one of the foregoing aspects.

This application further provides a terminal device capability transmission chip, storing an instruction. When the instruction runs on a communications device, the communications device performs the corresponding methods according to the foregoing aspects.

This application further provides a terminal device capability transmission apparatus. The apparatus includes a memory, a processor, and a computer program that is stored in the memory and that can run in the processor. When executing the computer program, the processor implements the corresponding methods according to the foregoing aspects.

This application further provides a terminal device capability transmission apparatus. The apparatus includes a processor. The processor is configured to: couple to a memory, read an instruction in the memory, and implement, based on the instruction, the corresponding methods according to the foregoing aspects. It may be understood that the memory may be integrated into the processor, or may exist independent of the processor.

This application further provides a terminal device capability transmission apparatus. The apparatus includes a processor. When executing a computer program, the processor implements the corresponding methods according to the foregoing aspects.

This application further provides a terminal device capability transmission system. The system includes the apparatuses on a terminal side provided above, and the apparatuses on a network side provided above. These system components respectively implement the corresponding methods according to the foregoing aspects.

It may be understood that any apparatus, computer storage medium, computer program product, chip, or system provided above is configured to implement the corresponding method provided above. Therefore, for beneficial effects that can be achieved by the apparatus, computer storage medium, computer program product, chip, or system, refer to beneficial effects of the corresponding method. Details are not described herein again.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the embodiments of this application and these accompanying drawings without creative efforts.

DESCRIPTION OF EMBODIMENTS

Figure 1:
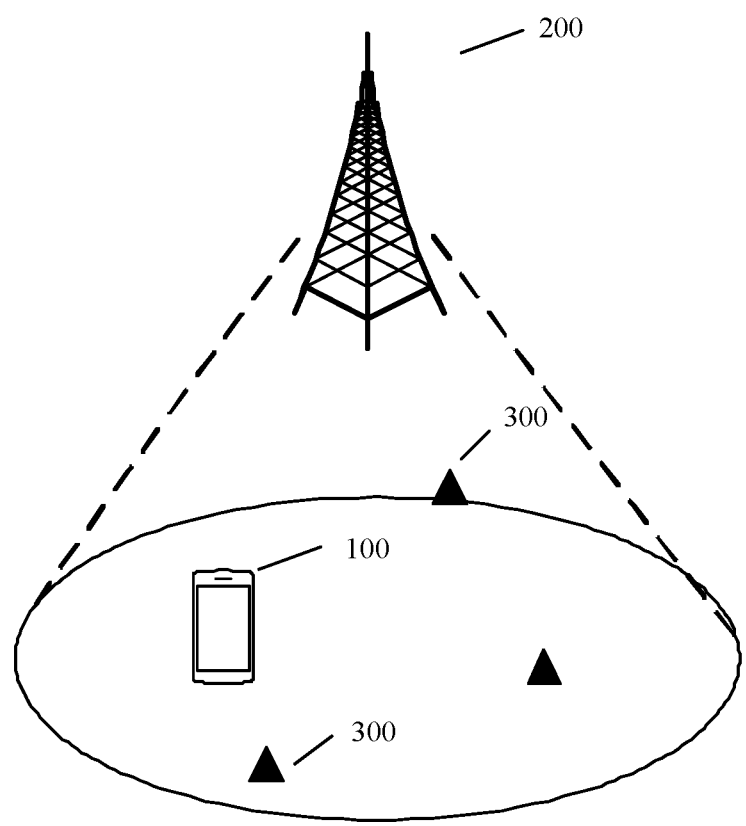
FIG. 1 shows a network system architecture in this application.

To make the technical problems resolved, the technical solutions used, and the technical effects achieved in this application clearer, the following describes the technical solutions in this application with reference to the accompanying drawings in the embodiments. The detailed descriptions provide various embodiments of a device and/or a process by using block diagrams, flowcharts, and/or examples. These block diagrams, flowcharts, and/or examples include one or more functions and/or operations, and therefore a person in the art may understand that each function and/or operation in the block diagrams, the flowcharts, and/or the examples may be performed independently and/or jointly by using much hardware, software, and firmware, and/or any combination thereof.

"A plurality of" in this application refers to two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In this application, the terms "first", "second", "third", "fourth", and the like are intended to distinguish between different objects but do not limit a sequence of the different objects.

In this application, the nouns "network" and "system" are often used alternately, but a person skilled in the art may understand the meanings thereof. In some cases, all "terminals"/"terminal devices" mentioned in this application may be mobile devices, for example, mobile phones, personal digital assistants, handheld or laptop computers, and similar devices having a telecommunications capability. In some cases, the "terminals"/"terminal devices" may also be wearable devices or in-vehicle devices, and include terminals in a future 5G network, terminals in a future evolved Public Land Mobile Network (PLMN), or the like. Such a terminal may include a device and a removable storage module (for example, but not limited to a universal integrated circuit card (UICC) including a subscriber identification module (SIM) application, a universal subscriber identification module (USIM) application, or a removable user identity module (R-UIM) application) associated with the device. Alternatively, such a terminal may include a device that does not have the module. In another case, the terms "terminal"/"terminal device" may be a non-portable device having a similar capability, for example, a desktop computer, a set top box, or a network device. The terms "terminal"/"terminal device" may also be any hardware or software component that can terminate a communication session of a user. In addition, "user terminal", "User Equipment", "UE", "station", "station", "STA", "user equipment", "user agent", "User Agent", "UA", "user device", "mobile device", "device", and the like are alternative terminologies synonymous with the "terminal"/"terminal device" in this specification. For ease of description, in this application, the devices mentioned above are collectively referred to as user equipment or UE.

The "access node" mentioned in this application is a network device, is an apparatus deployed in radio access network to provide a wireless communication function for a terminal device, and has functions such as scheduling and configuring a downlink reference signal to UE. The access node may include various forms of macro base stations, micro base stations, relay stations, access points, and the like, including systems and devices for improving peer devices in a conventional wireless telecommunications system. Such advanced or next-generation devices may be included in a Long Term Evolution (LTE) communications system, a 5G communications system, a future evolved system, or a plurality of communication fusion systems, for example, an evolved universal terrestrial radio access network NodeB (E-UTRAN NodeB, eNB) included in the LTE system, a new radio access NodeB (NR NodeB) included in 5G, another radio access point, or a similar component. In systems using different radio access technologies, a device having an access node function may have different names. For ease of description, in this application, the foregoing apparatuses providing the wireless communication function for the UE are collectively referred to as an access node.

FIG. 1 shows a network system architecture in this application. The system is used for UE capability reporting and channel state information (CSI) measurement. The system includes UE 100 and an access node 200. FIG. 1 uses an example of two stages, connection establishment and CSI measurement, between the UE 100 and the access node 200 in a movement process of the UE 100. Optionally, if the network is a network centered on a user and tracks the user as the user moves, the system further includes at least one transmission and reception point 300 (TRP). The transmission and reception point 300 has some functions of an access node 200 corresponding to a region in which the transmission and reception point 300 is located, can partially replace the access node 200 to interact with the UE 100, and may further have particular functions in a particular scenario. For example, the transmission and reception point 300 can listen to an uplink tracking reference signal sent by an inactive user that does not access the network, and perform listening by using the user as a center and moving with the user. After the user establishes a connection to the access node 200, capability reporting of the UE may also be sent to the access node 200 by using the transmission and reception point 300.

After the UE 100 establishes the connection to the access node 200, the UE 100 reports the capability of the UE, so that the access node 200 performs corresponding configuration. The reported capability includes a UE capability for CSI reporting, a UE capability for pilot configuration, a capability of supporting a CSI measurement type, a cache capability, and the like. In this application, the CSI reporting capability is focused. The UE 100 reports, to the access node 200, CSI reporting capability information related to a quantity, supported in at least one time-domain unit, of ports of pilots used for CSI measurement. A concept of the pilot may include a reference signal (RS), a synchronization signal block (SSB), a preamble, and the like. Subsequently, this application is described by using the RS to represent the pilot. After receiving a CSI measurement and reporting related configuration, the access node 200 configures the UE 100 based on the capability information, including a resource configuration and a reporting configuration. Based on the capability information, the access node 200 needs to consider whether the CSI measurement configuration exceeds a processing capability of the UE, whether processing of corresponding CSI measurement can be completed when the UE 100 needs to perform reporting, and can perform reporting, and an appropriate time for configuring or triggering the UE 100 to perform reporting.

Then, the CSI measurement stage is performed. The access node 200 sends a pilot signal to the UE 100 to perform channel measurement and interference measurement. The UE 100 reports channel state information (CSI), including, for example, a precoding matrix indicator (PMI), a rank indication (RI), and a channel quality indicator (CQI). The UE 100 may inform, by using the PMI, the access node 200 of an optimal precoding matrix in current downlink transmission, and inform, by using the RI, the access node 200 of an optimal quantity of layers in the current downlink transmission. The CQI indicates, after the suggested RI and PMI are used, an available modulation and coding scheme for ensuring that a bit error rate of downlink data receiving does not exceed a predetermined value. The CSI may be periodically or aperiodically reported to the access node 200. A difference between the two manners lies in that reporting configuring or triggering manners are different.

It should be noted that, FIG. 1 shows merely an example of a network system architecture in this application, and this application is not limited thereto. Similarly, this application may also be applied to an IEEE 802.11 system. A station (STA) reports a channel measurement information reporting capability of the station to an access point (AP), thereby effectively configuring channel measurement reporting of the STA.

Embodiment 1

Figure 2:
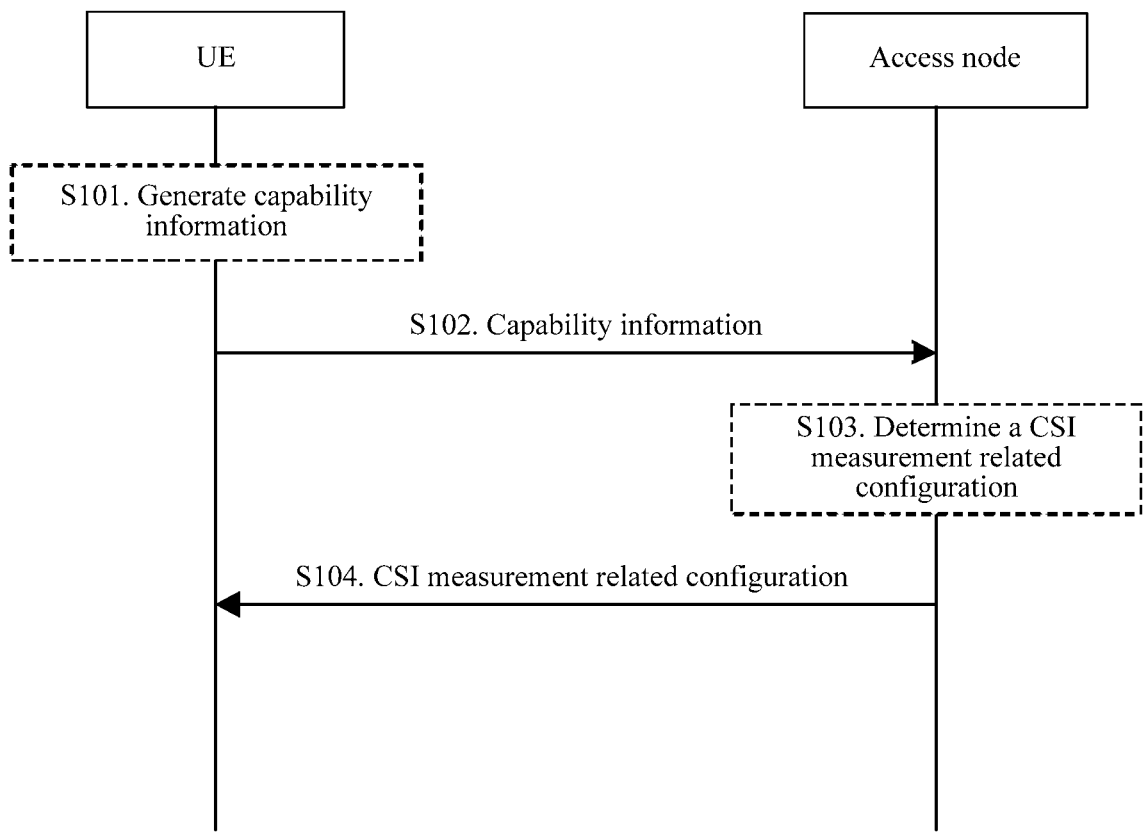
FIG. 2 is a flowchart of a first embodiment of a terminal device capability reporting method according to this application.

In a network, UE establishes a connection to an access node, and reports a CSI reporting capability by using a method in this embodiment, so that the access node learns of an actual CSI reporting capability of the UE, thereby flexibly configuring CSI measurement and reporting. In this embodiment and subsequent embodiments, interaction between the UE and the access node is described merely by way of example. This application is not limited thereto. When a transmission and reception point (TRP) managed by the access node in the network has some related functions of the access node, this application may further be applied to a scenario in which the UE interacts with the TRP to report the CSI reporting capability. According to this embodiment of this application, FIG. 2 is a flowchart of a first embodiment of a terminal device capability reporting method according to this application. For ease of understanding the solution, behavior on sides of both the UE and the access node is described in this embodiment and the subsequent embodiments. Descriptions are provided from perspectives of all interacting parties. However, this is in no way limited to that improvements in the system are to combine steps of all the interacting parities. The technical solution provided in this application has improvements on each side in the system.

The method includes the following steps.

S101. UE generates capability information.

After establishing a connection to the access node, the UE needs to report, to the access node, capability information of a capability supported by the UE. The reported capability includes a UE capability for CSI reporting, a UE capability for pilot configuration, and the like. In this application, the CSI reporting capability is focused. The CSI reporting capability is capability reflection of a calculation capability of the UE that is related to a CSI reporting requirement.

S102. The UE sends the capability information of the UE to an access node.

The capability information is used to indicate a channel state information (CSI) reporting capability of the UE. The capability information is associated with a quantity, supported by the UE in at least one time-domain unit, of ports of pilots (for example, RSs) used for CSI measurement. The quantity of ports of the pilots (for example, the RSs) used for CSI measurement may be a quantity of ports for sending the pilots (for example, the RSs) used for CSI measurement. The port may be logically understood as a virtual antenna. The port is defined from a perspective of a receiver. The receiver considers a port as an independent antenna channel. Ports may be distinguished by using different time-frequency resource locations, different code-domain extension sequences, and the like. Different ports may be used to distinguish different channels.

There may be one piece of or at least two pieces of capability information. For different CSI measurement types such as different codebook types, different precoding matrix indicator (PMI) types, or different bandwidth part (BWP) sizes, optionally, there may be different combinations of types, such as different codebook types and different PMI types, different codebook types and different BWP sizes, different PMI types and different BWP sizes, or different codebook types, different PMI types, and different BWP sizes. The at least two pieces of capability information may respectively indicate CSI reporting capabilities of the UE for different CSI measurement types. If the capability information is not distinguished for the different CSI measurement types, optionally, the CSI reporting capability of the UE is determined based on a reporting capability in a case of a particular type (for example, a maximum complexity type, a maximum time-consuming type, or a preset specified type). The capability information indicates a CSI reporting capability in a case of a particular type.

The quantity of ports of the pilots used for CSI measurement includes at least one of the following: a quantity of ports of pilots used for channel measurement, a sum of the quantity of ports of the pilots used for channel measurement and a quantity of ports of pilots used for interference measurement, and a weighted sum of the quantity of ports of the pilots used for channel measurement and the quantity of ports of the pilots used for interference measurement. Optionally, if calculation complexity of the pilot used for interference measurement is less than complexity of the pilot used for channel measurement, it may be selected that a weighting factor of the quantity of ports of the pilots used for interference measurement is less than or equal to 1. However, this is merely an example in this application, and this application is not limited thereto.

The CSI reporting capability of the UE may be reflected by using the quantity, supported in the at least one time-domain unit, of ports of the pilots used for CSI measurement, and optionally, by using a maximum quantity, supported in the at least one time-domain unit, of ports of the pilots used for CSI measurement, that is, reflection of a maximum calculation amount that can be processed by the UE in the at least one time-domain unit; or by using a quantity, supported in at least one time-domain unit and determined according to a predetermined policy and depending on a particular consideration, of ports of pilots used for CSI measurement, for example, a quantity of ports that reflects an average calculation capability or a quantity of ports that can be processed in a particular scenario. A concept of the pilot may include a reference signal (RS), a synchronization signal block (SSB), a preamble, and the like. Subsequently, this application is described by using the RS to represent the pilot.

The CSI reporting capability of the UE may also be reflected by using a quantity of time-domain units required for supporting a predetermined quantity of ports of the pilots used for CSI measurement (namely, information about a quantity of time-domain units that is required for calculating a calculation amount corresponding to the predetermined quantity of ports). Specifically, for example, the predetermined quantity of ports is P (P is greater than or equal to 1). Optionally, the predetermined quantity of ports may be a preset minimum configurable quantity of ports that is supported by the UE, a preset maximum configurable quantity of ports that is supported by the UE, or a quantity of ports that is determined according to a predetermined configuration criterion. The quantity of time-domain units that is required for the P ports is calculated as N (N is greater than or equal to 1). Therefore, P/N is a quantity, supported in each time-domain unit, of ports of the pilots used for CSI measurement. It can be learned that the quantity of time-domain units that is required for calculating the predetermined quantity of ports of the pilots used for CSI measurement is in an indirect association relationship with the quantity, supported in the at least one time-domain unit, of ports of the pilots used for CSI measurement. Optionally, the quantity of time-domain units that is required for calculating the predetermined quantity of ports of the pilots used for CSI measurement may be a minimum quantity of time-domain units that is required for calculating the predetermined quantity of ports of the pilots used for CSI measurement, that is, reflecting a fastest processing speed of the UE, or may be the quantity, determined according to a predetermined policy and depending on a particular consideration, of time-domain units that is required for calculating the predetermined quantity of ports of the pilots used for CSI measurement, for example, a quantity of time-domain units reflecting an average calculation speed or a quantity of time-domain units corresponding to a processing speed in a particular scenario.

It should be noted that, this application is not limited to such two CSI capability reflection representations, and any direct or indirect representation associated with the quantity, supported in the at least one time-domain unit, of ports of the pilots used for CSI measurement can be used in this application. Therefore, a corresponding CSI capability indicates that the capability information includes information about the quantity, supported in the at least one time-domain unit, of ports of the pilots used for CSI measurement or information about the quantity of time-domain units that is required for calculating the predetermined quantity of ports of the pilots used for CSI measurement.

For division of the time-domain unit, one time-domain unit may include at least one of the following division types: n time-domain symbols, n mini-slots, n slots, n subframes, n frames, or n time-domain subunits defined in another form, where n is greater than or equal to 1.

The capability information may be indicated by using a bit in a bitmap or by using a value of an indication field. For example, if the capability information is the foregoing quantity, supported in the at least one time-domain unit, of ports of the pilots used for CSI measurement, it is assumed that a quantity of potential values of all possible CSI reporting capabilities is P. (For example, P is 32. In this case, all the possible CSI reporting capabilities have 32 potential values. The 32 potential values correspond to port 1 to port 32, including port 1 and port 32. This is merely an example. The potential values may alternatively correspond to port 1 to port 48, and so on.) An indication manner by using the bit in the bitmap may be: The bitmap has a length of P bits, and the following example is described by using an example in which P is 32. It may be understood that this application is not limited thereto. Port 1 to port 32 are separately indicated by each of the 32 bits, and the bit may be set to 1 or 0 for indication. For example, the quantity of ports to be reported is M. In this case, the $M^{th}$ bit (a start location is 1) in the bitmap reported by the UE is set to 1 (or 0), and other bits are set to 0 (or 1). When the value of the indication field is used for indication, the quantity of ports may be indicated by using different values of an indication field having a length of $\lceil \log_2 P \rceil$ bits. Likewise, if the capability information is the foregoing quantity of time-domain units that is required for calculating the predetermined quantity of ports of the pilots used for CSI measurement, it is assumed that a quantity of potential values of all possible CSI reporting capabilities is N. (Likewise, for example, N is 16. In this case, all the possible CSI reporting capabilities have 16 potential values, for example, unit 1 to unit 16 required for calculating 32 ports.) An indication manner using the bit in the bitmap may be: The bitmap has a length of N bits, assuming that the quantity of time-domain units to be reported is M (that is, calculating the 32 ports requires M units), the $M^{th}$ bit (a start location is 1) in the bitmap reported by the UE is set to 1 (or 0), and other bits are set to 0 (or 1). When the value of the indication field is used for indication, the quantity of time-domain units may be indicated by using different values of an indication field having a length of $\lceil \log_2 N \rceil$ bits. It may be understood that an indication form is not limited to the foregoing examples, and all manners that can indicate different types may be used in this application.

S103. The access node determines a CSI measurement related configuration of the UE based on the received capability information reported by the UE.

The access node determines the CSI measurement related configuration of the UE. Optionally, the access node determines a configuration range based on the CSI reporting capability of the UE, and then selects a determined configuration based on a status of the access node and a possible status of the UE. Optionally, the related configuration may include a configuration of the pilot used for CSI measurement, a configuration of a corresponding time-frequency resource, and a reporting configuration. The following manner is used as an example for description, but this application is not limited thereto. For example, a base station configures one measurement setting, one or more reporting settings, and one or more resource settings based on the received capability information reported by the UE. Each measurement setting includes one or more links. Each link is used to connect one reporting setting and one resource set, and indicate whether the measurement setting is used for channel measurement or interference measurement. Each reporting setting includes content of the CSI reporting and occupied time-domain and frequency-domain resource locations. Each resource setting includes time-domain and frequency-domain resource locations occupied by a pilot resource used for CSI measurement. When the foregoing content is configured, the access node needs to consider whether the configuration exceeds a processing capability of the UE, whether processing of corresponding CSI measurement can be completed when the UE needs to perform reporting, and can perform reporting, and an appropriate time for configuring or triggering the UE to perform reporting. Therefore, optionally, a configuration related parameter may include at least one of the following: a quantity of reporting settings, a quantity of resource settings, a quantity of CSI pilot resource settings included in each resource setting, a quantity of CSI pilot resources included in each resource setting, a quantity of ports of a CSI pilot included in each resource setting, a periodically reported period, and an aperiodically reported time offset, where the time offset is a time interval from CSI reporting triggering to CSI reporting.

For a specific resource configuration policy, refer to detailed descriptions of FIG. 6 to FIG. 8 below. Details are not described herein.

S104. The access node sends information about the CSI measurement related configuration to the UE.

The UE performs configuration based on the information about the CSI measurement related configuration that is sent by the access node, and completes CSI measurement and reporting based on the configuration.

It should be noted that, the foregoing merely describes a manner of defining the CSI reporting capability to be associated with the quantity, supported by the UE in the at least one time-domain unit, of ports of the pilots (for example, the RSs) used for CSI measurement. However, this application is not limited thereto. The CSI reporting capability may further be defined as a quantity of ports supported in at least one unit/a quantity of pilots (CSI-RS) used for CSI measurement/a quantity of CSI-RS sets/a quantity of CSI-RS settings. The set may include one or more CSI-RS resources, and the setting may include a plurality of sets.

According to the terminal device capability reporting method in this embodiment of this application, the capability information that can reflect the actual CSI reporting capability of the UE is reported, so that the access point can learn the actual CSI reporting capability of the UE, thereby flexibly configuring CSI measurement and reporting of the UE.

Embodiment 2

Figure 3:
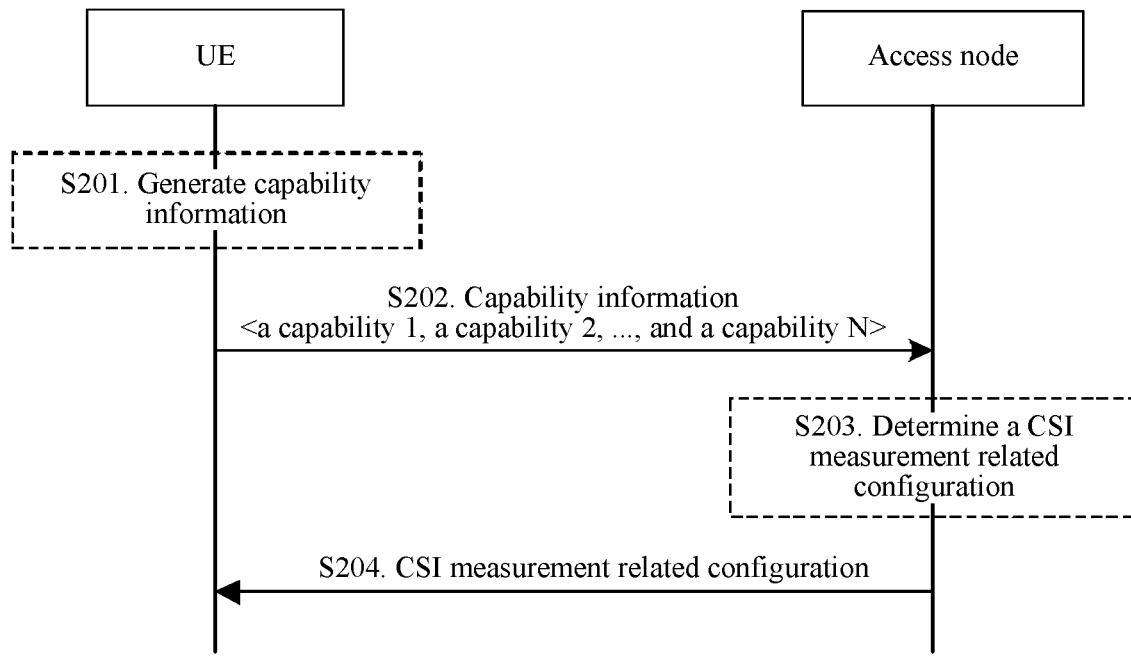
FIG. 3 is a flowchart of a second embodiment of a terminal device capability reporting method according to this application.

FIG. 3 is a flowchart of a second embodiment of a terminal device capability reporting method according to this application. A difference between this embodiment and Embodiment 1 lies in that, in this embodiment, definitely, there are at least two CSI reporting capabilities. Content the same as or similar to that in Embodiment 1 is not described again in this embodiment. It should be noted that, the CSI reporting capability in this embodiment is not necessarily defined, in the manner in Embodiment 1, to be associated with the quantity, supported by the UE in the at least one time-domain unit, of ports of the pilots used for CSI measurement, and may be a CSI reporting capability defined for another purpose. The manner in this embodiment may be used provided that there are at least two CSI reporting capabilities.

The method includes the following steps.

S201. UE generates capability information.

In a network, when the CSI reporting capabilities of the UE need to be distinguished for different CSI measurement types, for example, for different codebook types (such as type I and type II), different precoding matrix indicator (PMI) types (such as having a PMI, having no PMI, a narrowband PMI, and a broadband PMI), and different bandwidth part (BWP) sizes, optionally, there may be different combinations of types, such as different codebook types and different PMI types, different codebook types and different BWP sizes, different PMI types and different BWP sizes, or different codebook types, different PMI types, and different BWP sizes.

An access node needs to perform CSI measurement related configuration separately based on the reporting capabilities of the UE for different CSI measurement types. Therefore, the CSI reporting capabilities need to be determined for the different CSI measurement types, to generate at least two pieces of capability information of the CSI reporting capabilities corresponding to the different CSI measurement types.

If the CSI reporting capability is defined in the manner in Embodiment 1, for details, refer to related descriptions in Embodiment 1. Details are not described herein again.

S202. The UE sends the capability information of the UE to an access node.

In this embodiment, the capability information includes capability information of a capability 1, a capability 2, . . . , and a capability N each indicating a CSI reporting capability corresponding to the different CSI measurement types.

The CSI reporting capabilities for the different CSI measurement types may be correspondingly indicated by using a corresponding format location of each CSI reporting capability (for example, the capability 1 or the capability 2) in a signaling format in reporting signaling (for example, the first piece of capability information corresponds to codebook type I, and the second piece of capability information corresponds to codebook type II). The CSI reporting capabilities may have a concatenation relationship in the format (that is, independent fields are connected end-to-end, to indicate more values compared with one field). A meaning corresponding to each value may be different codebook types, different PMI types, different BWP sizes, or various combinations of the foregoing types.

S203. The access node determines a CSI measurement related configuration of the UE based on the received capability information reported by the UE.

Based on a plurality of pieces of received indication information of the CSI reporting capabilities, the access node performs CSI measurement related configuration separately based on the reporting capabilities of the UE for the different CSI measurement types. Other content similar to S103 is not described herein again.

S204. The access node sends information about the CSI measurement related configuration to the UE.

The UE performs configuration based on the information about the CSI measurement related configuration that is sent by the access node, and completes CSI measurement and reporting based on the configuration during subsequent CSI measurement.

According to the terminal device capability reporting method in this embodiment of this application, the UE reports the plurality of CSI reporting capabilities for the different CSI measurement types, so that the access point can learn of actual CSI reporting capabilities of the UE for the different CSI measurement types, thereby flexibly configuring CSI measurement and reporting of the UE.

Embodiment 3

Figure 4:
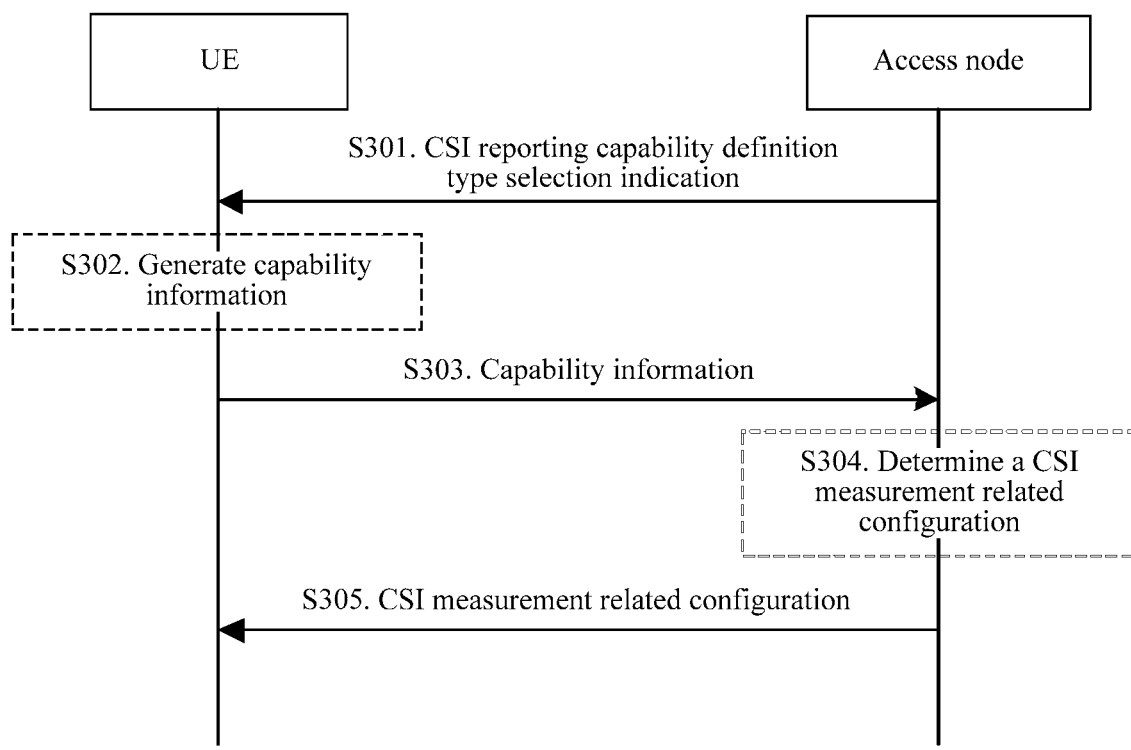
FIG. 4 is a flowchart of a third embodiment of a terminal device capability reporting method according to this application.

FIG. 4 is a flowchart of a third embodiment of a terminal device capability reporting method according to this application. A difference between this embodiment and Embodiment 1 or 2 lies in that, in this embodiment, a UE capability reporting procedure is performed when a UE capability for CSI reporting has different definition type selections. In addition, Embodiment 2 describes a case in which the capability information has a plurality of capability values, and this embodiment is mainly for a case in which a selected format/definition form corresponding to each capability value is optional. Content the same as or similar to that in Embodiment 1 or 2 is not described again in this embodiment. The method includes the following steps.

S301. An access node sends CSI reporting capability definition type selection indication information to the UE.

When a network includes a plurality of CSI reporting capability definition types, after establishing a connection to the access node, the UE is uncertain about a definition type of a CSI reporting capability to be reported to the access node. Therefore, the access node needs to send the CSI reporting capability definition type selection indication information to the UE, to inform the UE of a definition type of the CSI reporting capability that is to be determined and reported subsequently.

It should be noted that, in this embodiment, a CSI reporting capability, corresponding to the CSI reporting capability definition type selection indication information is not necessarily defined in the manner in Embodiment 1, and may be a CSI reporting capability defined for another purpose. The manner in this embodiment may be used for indication provided that the CSI reporting capability has a plurality of definition types.

Optionally, in the definition of the CSI reporting capability in Embodiment 1, the definition type is used for defining different CSI reporting capabilities according to different division types of a time-domain unit. For example, the CSI reporting capability may be associated with a quantity, supported in n symbols, of ports of pilots used for CSI measurement, a quantity, supported inn mini-slots, of ports of pilots used for CSI measurement, a quantity, supported in n slots, of ports of pilots used for CSI measurement, a quantity, supported in n subframes, of ports of pilots used for CSI measurement, a quantity, supported in n frames, of ports of pilots used for CSI measurement, or a quantity, supported in n time-domain subunits defined in another form, of ports of pilots used for CSI measurement, where n is greater than or equal to 1. Therefore, the definition type selection indication information may indicate definition type by using a definition type index or a corresponding bit in a bitmap. For example, the time-domain unit has four division types, the bitmap may have a length of four bits, and each bit corresponds to one type (for example, n symbols or n slots). A corresponding bit is set to 1 or 0, to indicate a division type (for example, division is performed by n symbols or n slots) used for dividing the time-domain unit in the definition types. The definition type selection indication information may be indicated by using a value of an indication field. For example, the time-domain unit has four division types, and the indication field may be two bits. Different values such as 00, 01, 10, and 11 of the field are used to respectively indicate the corresponding division types. It may be understood that an indication form is not limited to the foregoing examples, and all manners that can indicate different types may be used in this application.

Optionally, in a case of the quantity, supported in the at least one time-domain unit in the definition of the CSI reporting capability in Embodiment 1, of ports of the pilots used for CSI measurement, for the definition type, different CSI reporting capabilities may be defined for different calculation capability categories of the UE. For example, the CSI reporting capability may be associated with whether the UE has a plurality of parallel calculation channels for a CSI measurement reporting setting and whether each time-domain unit supports calculation of one reporting setting, and may include three categories: First, the UE does not have a plurality of parallel calculation channels for the CSI measurement reporting setting and each time-domain unit supports calculation of one reporting setting. Second, the UE has a plurality of parallel calculation channels for the CSI measurement reporting setting and one parallel calculation channel corresponds to calculation of one reporting setting. Third, the UE has a plurality of parallel calculation channels for the CSI measurement reporting setting and the plurality of parallel calculation channels correspond to parallel calculation of one reporting setting. Therefore, likewise, the definition type selection indication information may be indicated by using the definition type index or the corresponding bit in the bitmap, or be indicated by using the value of the indication field. A specific manner is similar, and details are not described herein again. It may be understood that an indication form is not limited to the foregoing examples, and all manners that can indicate different types may be used in this application.

S302. The UE generates capability information based on the received CSI reporting capability definition type selection indication information.

According to the foregoing example, if the definition type selection indication information indicates that the time-domain unit is divided in units of one slot, the capability information to be reported is generated based on an association definition of a quantity, supported in each slot, of ports of the pilots used for CSI measurement.

According to the foregoing example, if the definition type selection indication information indicates that the calculation capability category is the second category described above, the capability information to be reported is generated based on an association definition in which the UE has a plurality of parallel calculation channels for the CSI measurement reporting setting and one parallel calculation channel corresponds to calculation of one reporting setting.

S303. The UE sends the capability information of the UE to the access node.

The capability information is used to indicate a channel state information (CSI) reporting capability of the UE. If the capability information is associated with a quantity, supported by the UE in at least one time-domain unit, of ports of pilots, for details, refer to related descriptions in Embodiment 1. Details are not described herein again.

For the three calculation capability categories in the example in S302, in a case of the first category and the third category, optionally, the capability information includes information about a quantity of time-domain units required for calculating a predetermined quantity of ports of the pilots used for CSI measurement. In a case of the second category, optionally, the capability information includes information about a quantity of time-domain units required for calculating a predetermined quantity of ports of the pilots used for CSI measurement and a quantity of parallel calculation channels.

S304. The access node determines a CSI measurement related configuration of the UE based on the received capability information reported by the UE.

This step is similar to S103, and details are not described herein again.

S305. The access node sends information about the CSI measurement related configuration to the UE.

The UE performs configuration based on the information about the CSI measurement related configuration that is sent by the access node, and completes CSI measurement and reporting based on the configuration during subsequent CSI measurement.

According to the terminal device capability reporting method in this embodiment of this application, the access node sends the CSI reporting capability definition type selection indication information to the UE, so that the UE can effectively report the CSI reporting capability when the system includes the plurality of CSI reporting capability definition types.

Embodiment 4

Figure 5:
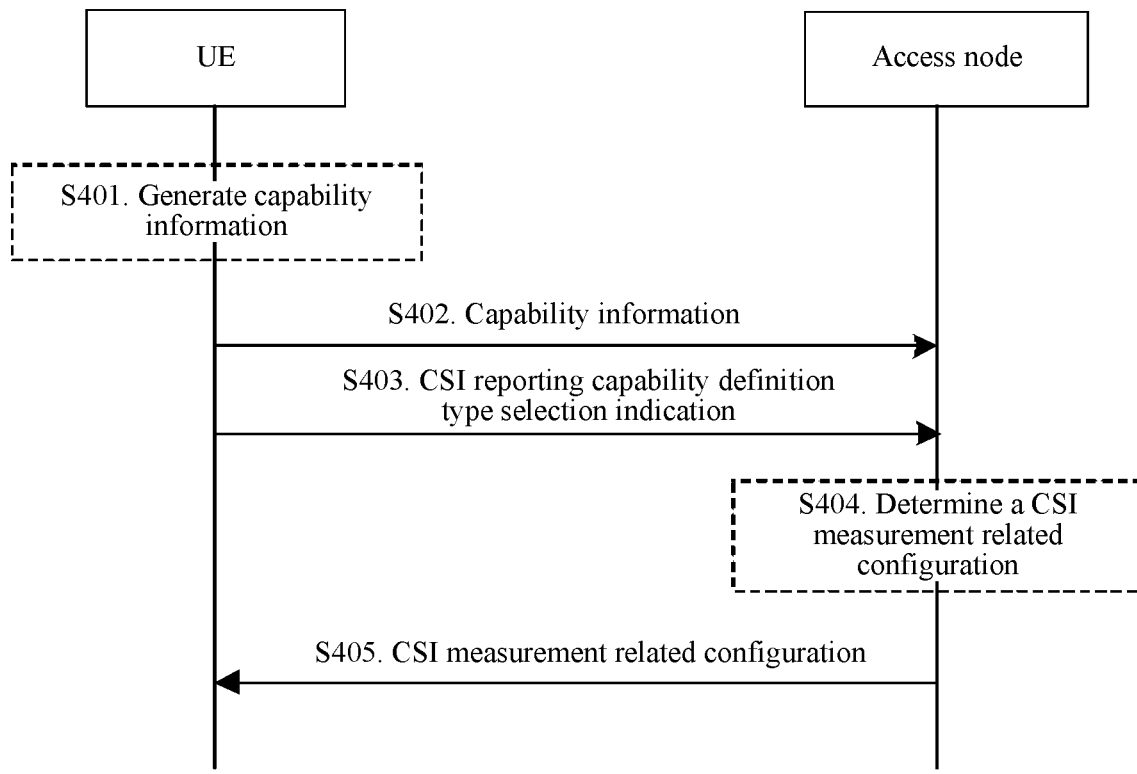
FIG. 5 is a flowchart of a fourth embodiment of a terminal device capability reporting method according to this application.

FIG. 5 is a flowchart of a fourth embodiment of a terminal device capability reporting method according to this application. A difference between this embodiment and Embodiment 3 lies in that, in this embodiment, UE reports a definition type selection indication when a UE capability for CSI reporting has different definition type selections. Content the same as or similar to that in Embodiment 3 is not described in this embodiment again. It should be noted that, similar to Embodiment 3, a CSI reporting capability in this embodiment is not necessarily defined in the manner in Embodiment 1, and may be a CSI reporting capability defined for another purpose. The manner in this embodiment may be used provided that the CSI reporting capability has a plurality of definition types.

The method includes the following steps.

S401. The UE generates capability information.

When a network includes a plurality of CSI reporting capability definition types, after establishing a connection to an access node to perform capability reporting, the UE may generate the capability information based on a CSI reporting capability definition type selected by the UE. For example, for a division type of a time-domain unit, the UE may flexibly reflect a calculation processing capability of the UE by using different time-domain unit division sizes based on a calculation capability of the UE.

S402. The UE sends the capability information of the UE to an access node.

For related descriptions of the capability information, refer to Embodiment 1 to Embodiment 3. Details are not described herein again.

S403. The UE sends, to the access node, CSI reporting capability definition type selection indication information selected by the UE.

When the network includes the plurality of CSI reporting capability definition types, optionally, the UE may indicate, to the access node by using different signaling formats of the capability information, a definition type selected by the UE. Optionally, the UE may inform, by using definition type selection indication information, the access node of a definition type selected by the UE. The definition type selection indication information and the capability information may be sent together or separately.

For examples of division of the definition type and an indication manner of the definition type selection indication information, refer to related descriptions in Embodiment 3. Details are not described herein again.

It should be noted that, there is no definite order between S402 and S403. The steps are merely intended to reflect that the UE sends two pieces of information to the access node. If the definition type selection indication information may be indicated by using different signaling formats of the capability information reported by the UE, S403 may be omitted. If the definition type selection indication information and the capability information are sent together, S402 and S403 are one step.

S404. The access node determines a CSI measurement related configuration of the UE based on the received capability information reported by the UE.

This step is similar to S103, and details are not described herein again.

S405. The access node sends information about the CSI measurement related configuration to the UE.

The UE performs configuration based on the information about the CSI measurement related configuration that is sent by the access node, and completes CSI measurement and reporting based on the configuration during subsequent CSI measurement.

According to the terminal device capability reporting method in this embodiment of this application, the UE indicates, to the access node, the definition type selected by the UE, so that when the system includes a plurality of CSI reporting capability definition types, the access node can effectively learn of the CSI reporting capability of the UE, thereby performing effective configuration.

The foregoing embodiments emphasize reporting of the CSI reporting capability of the UE. After learning of the reporting capability of the UE, the access node may perform CSI measurement related configuration based on the capability. The following provides descriptions about how the access node performs CSI measurement related configuration.

Figure 6:
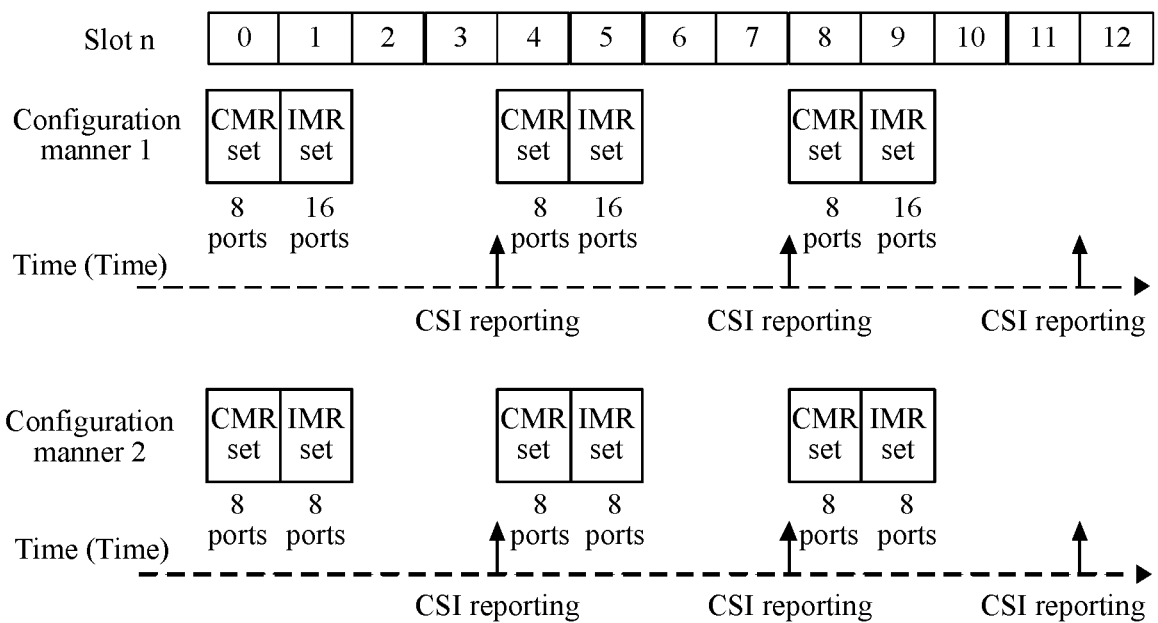
FIG. 6 is a schematic diagram of a configuration manner of configuring, by an access node based on a CSI reporting capability of UE, the UE to periodically or semi-persistently report CSI according to this application.

FIG. 6 is a schematic diagram of a configuration manner of configuring, by an access node based on a CSI reporting capability of UE, the UE to periodically or semi-persistently report CSI. There are two configuration manners: a configuration manner 1 and a configuration manner 2. It is assumed that a CSI reporting capability reported by the UE is that a maximum of four ports (4 ports) can be supported in each unit, and the unit is divided by one slot. In other words, the CSI reporting capability of the UE is that the UE can support a maximum of 4 ports in each slot. Therefore, when configuring CSI measurement and reporting of the UE, the access node needs to consider that the UE can support a maximum of 4 ports in each slot. When reporting CSI, the UE needs to complete a calculation amount for the corresponding CSI measurement, so as to report the CSI.

As shown in FIG. 6, in the configuration manner 1, the access node configures the UE to periodically or semi-persistently report CSI. The CSI is reported every four slot units. The access node configures, in the first slot unit (slot 0), a channel measurement reference signal set (CMR set) that includes 8 ports and that is used for CSI measurement, and configures, in the second slot unit (slot 1), an interference measurement reference signal set (IMR set) that includes 16 ports and that is used for CSI measurement. It can be learned that to complete channel measurement and interference measurement, the UE needs to complete a calculation amount for 8 ports+16 ports=24 ports. According to the CSI reporting capability of the UE, a maximum of 4 ports can be supported in each slot. In this case, the UE needs at least 6 slots to complete measurement calculation for 24 ports. Therefore, if the access node configures the calculation amount for CSI measurement with 24 ports in such a manner as the configuration manner 1, the UE cannot be configured to report CSI every four slots (for example, in the fifth slot unit (slot 4)). In this case, the UE cannot complete measurement or perform reporting. Therefore, the configuration manner 1 is an unavailable configuration.

As shown in FIG. 6, in the configuration manner 2, the access node configures the UE to periodically or semi-persistently report CSI. Likewise, the CSI is reported every four slot units. The access node configures, in the first slot unit, a CMR set that includes 8 ports, and configures, in the second slot unit, an IMR set that includes 8 ports. It can be learned that to complete channel measurement and interference measurement, the UE needs to complete a calculation amount for 8 ports+8 ports=16 ports. According to the CSI reporting capability of the UE, a maximum of 4 ports can be supported in each slot. In this case, the UE needs at least four slots to complete measurement calculation for 16 ports. In this case, if the access node configures the calculation amount for CSI measurement with 16 ports and a reporting period (every four slots) in such a manner as the configuration manner 2, the UE can complete corresponding measurement and perform reporting based on the configuration. Therefore, the configuration manner 2 is an available configuration.

Figure 7:
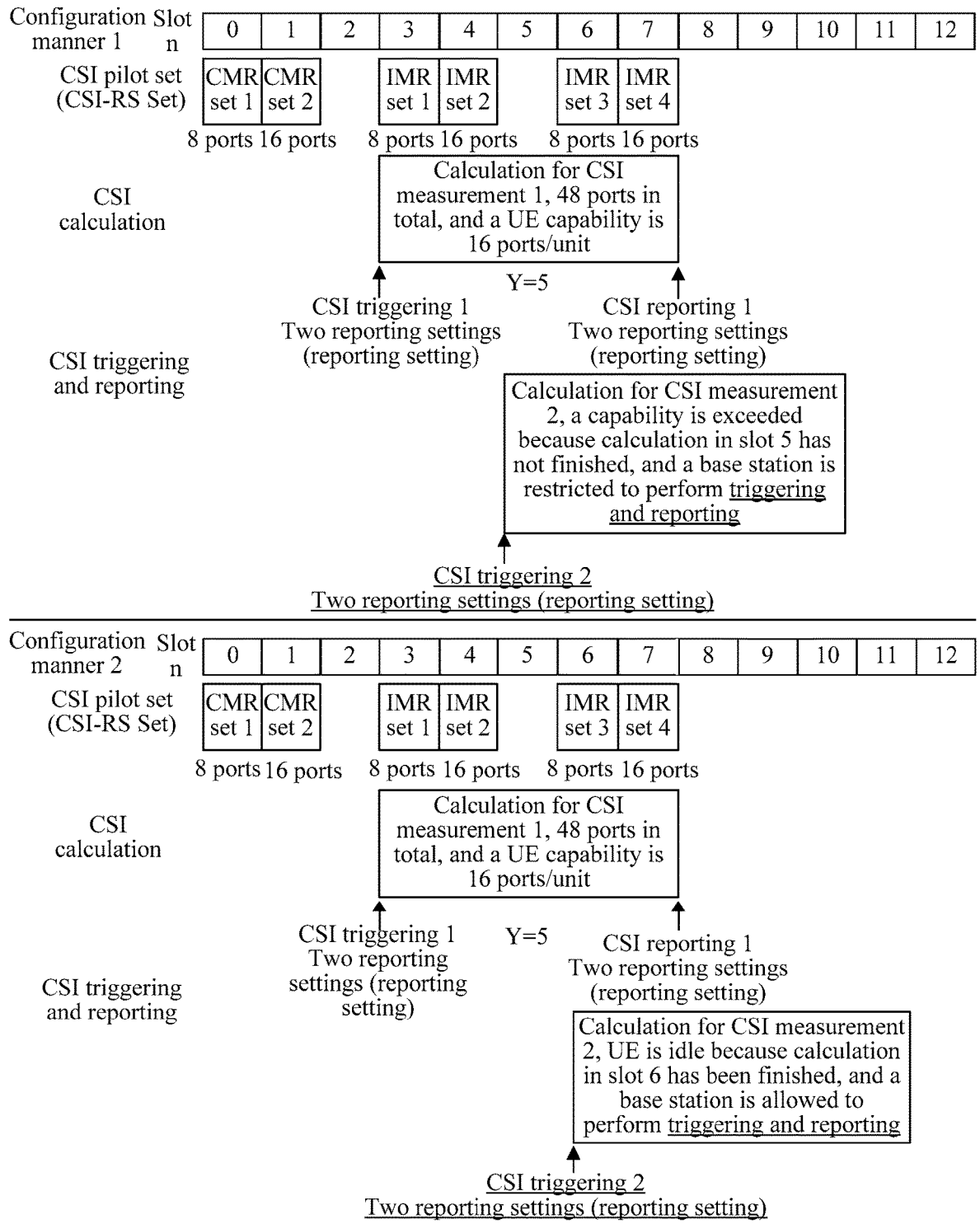
FIG. 7 is a schematic diagram of a configuration manner of configuring, by an access node based on a CSI reporting capability of UE, the UE to aperiodically report CSI according to this application.

FIG. 7 is a schematic diagram of a configuration manner of configuring, by an access node based on a CSI reporting capability of UE, the UE to aperiodically report CSI. There are two configuration manners: a configuration manner 1 and a configuration manner 2. It is assumed that a CSI reporting capability reported by the UE is that a maximum of 16 ports can be supported in each unit, and the unit is divided by one slot. That is, the CSI reporting capability of the UE is that the UE can support a maximum of 16 ports in each slot. Therefore, when configuring CSI measurement and reporting of the UE, the access node needs to consider that the UE can support a maximum of 16 ports in each slot. When reporting CSI, the UE needs to complete a calculation amount for the corresponding CSI measurement, so as to report the CSI.

As shown in FIG. 7, in the configuration manner 1, the access node configures a time offset for aperiodic reporting of the UE. The time offset is an interval between a triggering time-domain unit for CSI triggering sent by the access node and a time-domain unit for CSI reporting. As shown in FIG. 7, the time offset Y is configured as 5 slots.

For CSI measurement, a plurality of times of measurement and reporting (such as CSI measurement 1 and CSI measurement 2) may be performed in consideration of various factors (for example, an interference change). For the CSI measurement 1, a quantity of reporting settings configured for the UE for reporting is 2, respectively corresponding to a CMR set 1 and an IMR set 1, and a CMR set 2 and an IMR set 2. The access node configures, in the first slot unit (slot 0), the CMR set 1 that includes 8 ports and that is used for CSI measurement, configures, in the second slot unit (slot 1), the CMR set 2 including 16 ports, configures, in the fourth slot unit (slot 3), the IMR set 1 that includes 8 ports and that is used for CSI measurement, and configures, in the fifth slot unit (slot 4), the IMR set 2 including 16 ports. It can be learned that a total calculation amount for the CSI measurement 1 to be calculated by the UE is 8+16+8+16=48 ports.

For the CSI measurement 2, a quantity of reporting settings configured for the UE for reporting is 2, respectively corresponding to a CMR set 1 and an IMR set 3, and a CMR set 2 and an IMR set 4. The IMR set 3 including 8 ports is configured in the seventh slot unit (slot 6), and the IMR set 4 including 16 ports is configured in the eighth slot unit (slot 7). It can be learned that a total calculation amount for the CSI measurement 2 to be calculated by the UE is 8+16+8+16=48 ports.

It can be learned that for the CSI measurement 1, to complete calculation for 48 ports, the UE needs at least 48/16=3 slots. If the access node configures that the CSI measurement 1 is triggered in slot 3, the UE can complete the CSI measurement 1 and perform reporting in slot 8 after the configured time offset Y, namely, 5 slots. Therefore, the configuration of the time offset and the calculation amount for the CSI measurement 1 is available. Likewise, the configuration of the time offset and the calculation amount for the CSI measurement 2 is also available.

However, if for the CSI measurement 2, the access node configures that the CSI measurement 2 is triggered in slot 5, the UE is calculating the CSI measurement 1 at this moment, and has not finished calculation. In this case, this is beyond a capability of the UE, and the access node cannot configure that the CSI measurement 2 is triggered at this moment. Therefore, the configuration is unavailable.

As shown in FIG. 7, in the configuration manner 2, other conditions remain unchanged. If the access node configures that the CSI measurement 2 is triggered in slot 6, the UE is idle currently, and the access node may trigger new CSI reporting. The access node may configure triggering at this moment. The configuration is available.

Figure 8:
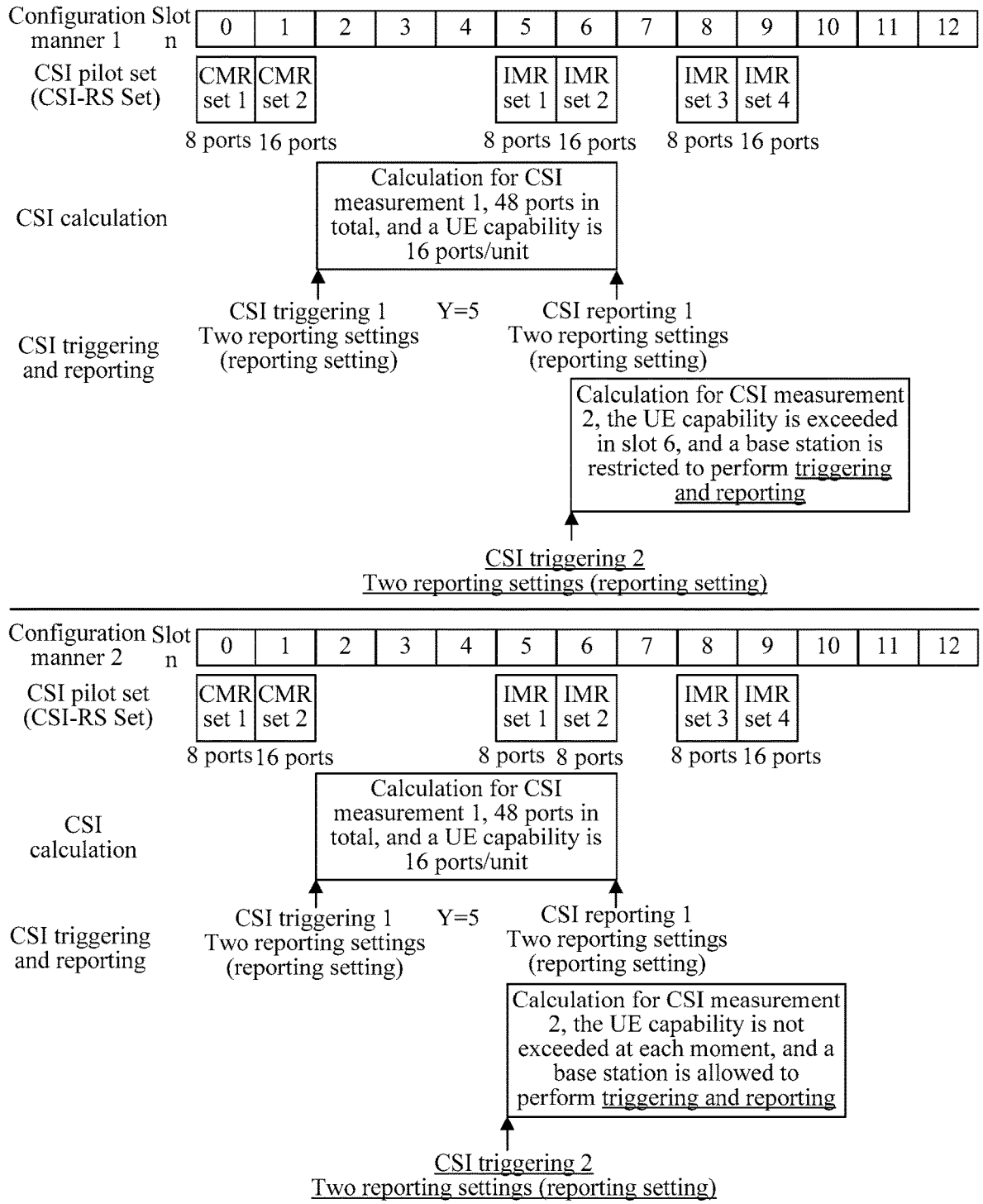
FIG. 8 is another schematic diagram of a configuration manner of configuring, by an access node based on a CSI reporting capability of UE, the UE to aperiodically report CSI according to this application.

FIG. 8 is another schematic diagram of a configuration manner of configuring, by an access node based on a CSI reporting capability of UE, the UE to aperiodically report CSI. There are two configuration manners: a configuration manner 1 and a configuration manner 2. It is assumed that a CSI reporting capability reported by the UE is that a maximum of 16 ports can be supported in each unit, and the unit is divided by one slot. In other words, the CSI reporting capability of the UE is that the UE can support a maximum of 16 ports in each slot. Therefore, when configuring CSI measurement and reporting of the UE, the access node needs to consider that the UE can support a maximum of 16 ports in each slot. When reporting CSI, the UE needs to complete a calculation amount for the corresponding CSI measurement, so as to report the CSI.

As shown in FIG. 8, in the configuration manner 1, the access node configures a time offset configured by the access node for aperiodic reporting of the UE is still 5 slots. For the CSI measurement 1, a quantity of reporting settings configured for the UE for reporting is 2, respectively corresponding to a CMR set 1 and an IMR set 1, and a CMR set 2 and an IMR set 2. The access node configures, in the first slot unit (slot 0), the CMR set 1 that includes 8 ports and that is used for CSI measurement, configures, in the second slot unit (slot 1), the CMR set 2 including 16 ports, configures, in the sixth slot unit (slot 5), the IMR set 1 that includes 8 ports and that is used for CSI measurement, and configures, in the seventh slot unit (slot 6), the IMR set 2 including 16 ports. It can be learned that a total calculation amount for the CSI measurement 1 to be calculated by the UE is 8+16+8+16=48 ports.

For the CSI measurement 2, a quantity of reporting settings configured for the UE for reporting is 2, respectively corresponding to a CMR set 1 and an IMR set 3, and a CMR set 2 and an IMR set 4. The IMR set 3 including 8 ports is sent in the seventh slot unit (slot 6), and the IMR set 4 including 16 ports is sent in the eighth slot unit (slot 7). It can be learned that a total calculation amount for the CSI measurement 2 to be calculated by the UE is 8+16+8+16=48 ports.

It can be learned that for the CSI measurement 1, to complete calculation for 48 ports, the UE needs at least 48/16=3 slots. However, it should be noted that in addition to the total calculation time, when performing configuration, the access node further needs to consider a relationship between a time of delivering a CMR set and an IMR set and a reporting time of the UE. For example, according to the configuration manner 1, if the access node triggers reporting of the CSI measurement 1 at the end of slot 1, after a preconfigured time offset, the UE needs to perform reporting at the end of slot 6. The IMR set 1 (8 ports) and the IMR set 2 (16 ports) are respectively delivered in slot 5 and slot 6. The UE is not idle in slot 6 yet, and needs to process calculation of an interference measurement setting. Therefore, the access node cannot configure that reporting of the CSI measurement 2 is triggered in slot 6, and can trigger the CSI measurement 2 at least at the end of slot 6 after the UE completes calculation of the CSI measurement 1. In addition, it should further be noted that, if the IMR set 1 and the IMR set 2 are respectively delivered in slot 5 and slot 6, the UE needs to perform reporting at the end of slot 6. If a sum of quantities of ports of the IMR set 1 and the IMR set 2 exceeds a quantity of ports supported by the UE in the two units, that is, 32 ports, the UE also cannot complete a calculation amount for the configuration in slot 6, and consequently, cannot perform reporting.

As shown in FIG. 8, in the configuration manner 2, other conditions remain unchanged. If the quantity of ports of the IMR set 2 changes to 8 ports, and the CSI measurement 2 is triggered in slot 5, the UE has a calculation capability of remaining 8 ports in both slot 5 and slot 6. Although in this case (slot 5 and slot 6), the configured IMR set 3 and IMR set 4 are not received, the base station can trigger new CSI reporting, and the UE may first calculate the CMR set 1 (8 ports) known in the CSI measurement 2. Therefore, the access node may configure that the CSI measurement 2 is triggered at this moment (in slot 5), and the configuration is available. It may be understood that in the configuration manner, the UE supports parallel processing. When the calculation capability is surplus, the UE may perform parallel calculation. That the UE supports parallel processing is considered as having a stronger UE capability for CSI reporting. One or more reporting settings may be configured if an average quantity of pilot ports in each time-domain unit is not greater than the UE capability before the CSI reporting.

It should be noted that the foregoing descriptions about the configuration manners are specifically for a case in which the CSI reporting capability of the UE is a maximum quantity, and supported in each time-domain unit, of ports of pilots used for CSI measurement. The configuration manners are merely examples for description, provide descriptions about how to configure the CSI reporting capability of the UE, and are not intended to limit this application. For different definition cases of the CSI reporting capability of the UE, the configuration logic in the foregoing examples is followed. The CSI measurement and reporting of the UE that are configured by the access node should not exceed the CSI reporting capability of the UE, so that the UE can complete the CSI measurement and reporting.

The foregoing describes the solutions provided in the embodiments of this application mainly by using a procedure in which various entities in the system interact with each other to perform parallel transmission control. It may be understood that to implement the foregoing functions, the foregoing various entities include hardware structures and/or software modules corresponding to the various functions. A person skilled in the art should be easily aware that, in combination with the units and algorithm steps of the examples described in the embodiments disclosed in this specification, this application can be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, function module division may be performed on the UE and the access node according to the examples of the methods. For example, various function modules may be divided according to the corresponding functions, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner. The following descriptions are made by using an example in which function modules are divided corresponding to functions.

Figure 9:
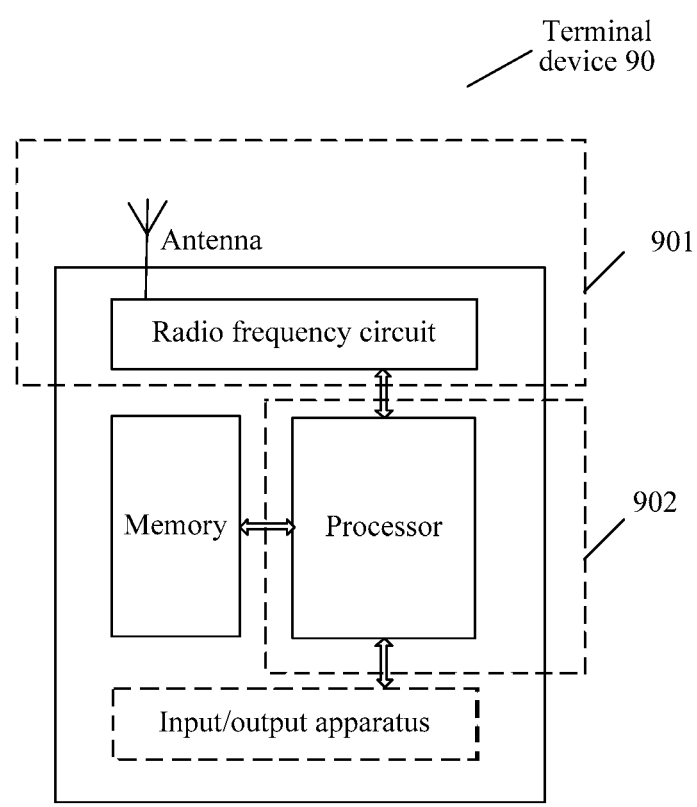
FIG. 9 is a simplified schematic structural diagram of a terminal device according to this application.

An embodiment of this application further provides a terminal device. The terminal device may be configured to perform the steps performed by the UE in any one of FIG. 2 to FIG. 5. FIG. 9 is a simplified schematic structural diagram of the terminal device. For ease of understanding and convenience of figure illustration, an example in which the terminal device is a mobile phone is used in FIG. 9. As shown in FIG. 9, the terminal device 90 includes a processor, a memory, a radio frequency circuit, an antenna, and an input/output apparatus. The processor is mainly configured to: process a communication protocol and communication data, control the terminal device 90, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices 90 of some types may not have the input/output apparatus. The memory and the processor may be integrated together or may be disposed independently. In addition, the radio frequency circuit and the processor may be integrated together or may be disposed independently.

When needing to send data, after performing baseband processing on the data to be sent, the processor outputs a baseband signal to the radio frequency circuit. The radio frequency circuit performs radio frequency processing on the baseband signal and sends a radio frequency signal to outside in a form of an electromagnetic wave by using the antenna. When data is sent to the terminal device 90, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit having transmission and receiving functions may be considered as a transceiver unit of the terminal device 90, and the processor having a processing function may be considered as a processing unit of the terminal device 90. As shown in FIG. 9, the terminal device 90 includes a transceiver unit 901 and a processing unit 902. The transceiver unit may also be referred to as a transceiver (including a transmitter and/or a receiver), a transceiver machine, a transceiver apparatus, a transceiver circuit, or the like. The processing unit may also be referred to as a processor, a processing board, a processing module, a processing apparatus, or the like. Optionally, a component for implementing a receiving function in the transceiver unit 901 may be considered as a receiving unit, and a component for implementing a sending function in the transceiver unit 901 may be considered as a sending unit. That is, the transceiver unit 901 includes a receiving unit and a sending unit. The transceiver unit may also be referred to as a transceiver machine, a transceiver, a transceiver circuit, or the like sometimes. The receiving unit may also be referred to as a receiver machine, a receiver, a receiver circuit, or the like sometimes. The sending unit may also be referred to as a transmitter machine, a transmitter, a transmitter circuit, or the like sometimes. In some embodiments, the transceiver unit 901 and the processing unit 902 may be integrated together or may be disposed independently. In addition, all functions of the processing unit 902 may be integrated into one chip for implementation. Alternatively, some functions may be integrated into one chip for implementation and some other functions are integrated into one or more other chips for implementation. This is not limited in this application. The term "unit" used in this specification may refer to an application-specific integrated circuit (ASIC), an electronic circuit, a processor (shared, dedicated, or group) and memory, or a combinational logic circuit that executes one or more software or firmware programs, and/or other suitable components that provide the function.

For example, in an implementation, the transceiver unit 901 is configured to perform the steps performed by the UE in S102 and/or S104 in FIG. 2, and/or other steps in this application. The processing unit 902 is configured to perform S101 in FIG. 2, and/or other steps in this application.

For example, in another implementation, the transceiver unit 901 is configured to perform the steps performed by the UE in S202 and/or S204 in FIG. 3, and/or other steps in this application. The processing unit 902 is configured to perform S201 in FIG. 3, and/or other steps in this application.

For example, in another implementation, the transceiver unit 901 is configured to perform the steps performed by the UE in S301, S303, and/or S305 in FIG. 4, and/or other steps in this application. The processing unit 902 is configured to perform S302 in FIG. 4, and/or other steps in this application.

For example, in another implementation, the transceiver unit 901 is configured to perform the steps performed by the UE in S402, S403, and/or S405 in FIG. 5, and/or other steps in this application. The processing unit 902 is configured to perform S401 in FIG. 5, and/or other steps in this application.

Figure 10:
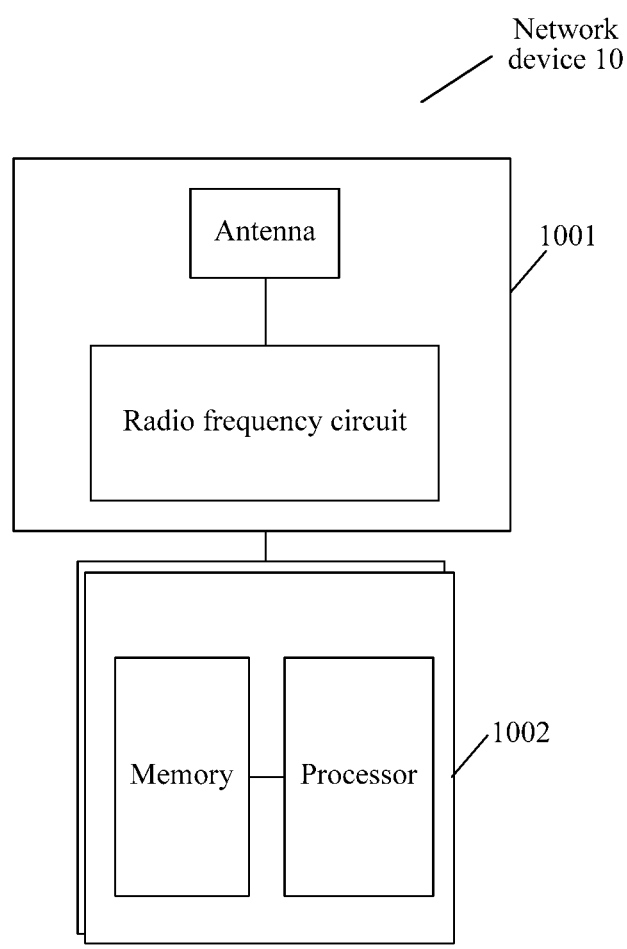
FIG. 10 is a simplified schematic structural diagram of a network device according to this application.

An embodiment of this application further provides a network device. The network device may serve as an access node or a transmission and reception point, and is configured to perform the steps performed by the access node in any one of FIG. 2 to FIG. 5. FIG. 10 is a simplified schematic structural diagram of the network device. The network device 10 includes a part 1001 and a part 1002. The part 1001 is mainly configured to receive and send a radio frequency signal and perform conversion between the radio frequency signal and a baseband signal. The part 1002 is mainly configured to perform baseband processing, control the network device 10, and the like. The part 1001 may be usually referred to as a transceiver unit, a transceiver machine, a transceiver circuit, a transceiver, or the like. The part 1002 is usually a control center of the network device 10, and may usually be referred to as a processing unit, a control unit, a processor, a controller, or the like, configured to control the network device 10 to perform steps performed by a measurement functional entity on an access side or by the access node/the transmission and reception point used as a measurement functional entity on an access side in the foregoing related embodiments. For details, refer to the foregoing descriptions of the related part.

A transceiver unit of the part 1001 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1001 may be considered as a receiving unit, and a component for implementing a sending function may be considered as a sending unit. That is, the part 1001 includes a receiving unit and a sending unit. The receiving unit may also be referred to as a receiver machine, a receiver, a receiver circuit, or the like. The sending unit may also be referred to as a transmitter machine, a transmitter, a transmitter circuit, or the like.

The part 1002 may include one or more boards. Each board may include one or more processors and one or more memories. The processor is configured to read and execute a program in the memory, to implement a baseband processing function and control the network device 10. If there are a plurality of boards, the boards may be interconnected to enhance a processing capability. In an optional implementation, alternatively, the plurality of boards may share one or more processors, or the plurality of boards share one or more memories, or the plurality of boards share one or more processors at the same time. The memory and the processor may be integrated together or may be disposed independently. In some embodiments, the part 1001 and the part 1002 may be integrated together or may be disposed independently. In addition, all functions of the part 1002 may be integrated into one chip for implementation. Alternatively, some functions may be integrated into one chip for implementation and some other functions are integrated into one or more other chips for implementation. This is not limited in this application.

For example, in an implementation, the transceiver unit may be configured to perform the steps performed by the access node in S102 and/or S104 in FIG. 2, and/or other steps in this application. The processing unit is configured to perform S103 in FIG. 2, and/or other steps in this application.

For example, in another implementation, the transceiver unit is configured to perform the steps performed by the access node in S202 and/or S204 in FIG. 3, and/or other steps in this application. The processing unit is configured to perform S203 in FIG. 3, and/or other steps in this application.

For example, in another implementation, the transceiver unit is configured to perform the steps performed by the access node in S301, S303, and/or S305 in FIG. 4, and/or other steps in this application. The processing unit is configured to perform S304 in FIG. 4, and/or other steps in this application.

For example, in another implementation, the transceiver unit is configured to perform the steps performed by the access node in S402, S403, and/or S406 in FIG. 5, and/or other steps in this application. The processing unit is configured to perform S404 in FIG. 5, and/or other steps in this application.

The apparatus on a terminal side provided above may be a terminal device, or may be a chip or a function module in a terminal device, and may implement the foregoing method by software or hardware, or by hardware executing corresponding software.

A specific implementation of the apparatus on a network side provided above may be an access node device. For example, the apparatus may be an access node device, or a chip or a function module in an access node device, and may implement the foregoing method by software or hardware, or by hardware executing corresponding software.

For descriptions of related content and beneficial effects of any terminal device, network device, and corresponding apparatus provided above, refer to the corresponding method embodiments provided above. Details are not described herein again.

This application further provides a terminal device capability transmission system. The system includes the UE (which may also be a UE-side apparatus implementing functions of the foregoing UE) and the access node (which may also be an access-side apparatus or a transmission and reception point implementing the foregoing access node function) in the foregoing implementations.

This application further provides a computer program product. When the computer program product runs on a computer, the computer performs any method provided above.

This application further provides a chip, storing an instruction. When the instruction runs on each of the foregoing devices, the device performs the method provided above.

This application further provides a computer storage medium, storing a computer program (instruction). When the program (instruction) runs on a computer, the computer performs the method provided above.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any available medium accessible by a computer, or a data storage device, such as a server or a data center, integrating one or more available media. The available medium may be a magnetic medium (for example, a soft disk, a hard disk, or a magnetic tape), an optical medium (for example, a DVD), a semiconductor medium (for example, a solid state disk (SSD)), or the like.

A proposal of the foregoing solutions in New Radio (NR for short) is as follows:

Actually, for each reporting setting, the actual UE capability for CSI reporting depends on how much workload UE can afford for calculating CSI info based on the CSI-RS resources configured in resource settings linked with the reporting setting. The total number of CSI-RS ports in each unit UE can afford can reflect the UE capability for CSI reporting. UE capability for CSI reporting can be defined as the maximum number of CSI-RS ports for each unit UE afford for update CSI. For UE supports processing in parallel would have a large UE capability for CSI reporting. One or more reporting settings can be configured if the average number of CSI-RS ports for each unit before CSI reporting is no larger than the UE capability.

Then we can the following proposal:

Proposal XX: UE capability for CSI reporting can be defined as the maximum number of CSI-RS ports for each unit UE afford for update CSI.

It can be learned that in the proposal, a total quantity of CSI-RS ports in each unit the UE can afford may reflect the UE capability for CSI reporting. The UE capability for CSI reporting may be defined as the maximum quantity of CSI-RS ports in each unit UE affords for CSI update. The UE that supports processing in parallel would have a larger UE capability for CSI reporting. One or more reporting settings may be configured if an average quantity of CSI-RS ports in each unit is not greater than the UE capability before the CSI reporting.

Finally, preferably, a preferred solution in the proposal is that the UE capability for CSI reporting may be defined as the maximum quantity of CSI-RS ports in each unit supported by the UE for CSI update.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor/controller or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the essence and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the essence and scope of this application. This application is intended to cover these modifications and variations of this application provided that they fall within the scope of protection defined by the following claims and their equivalent technologies.

What is claimed is:

1. A method for capability reporting comprising:
   transmitting capability information to a network device, wherein the capability information indicates a maximum quantity of ports of reference signals (RSs) for channel state information (CSI) measurement supported by a terminal device in a time-domain unit, wherein the time-domain unit is one slot, and wherein the capability information is determined based on a capability of the terminal device;
   receiving a CSI measurement configuration configured based on the capability information;
   receiving at least one CSI-RS based on the CSI measurement configuration; and
   transmitting CSI based on the at least one CSI-RS.

2. The method according to claim 1, wherein the capability information corresponds to at least one of codebook type I or codebook type II.

3. The method according to claim 1, wherein the capability information is indicated by using a bit in a bitmap or by using a value of an indication field.

4. The method according to claim 1, wherein the maximum quantity of ports of reference signals used for CSI measurement comprises at least one of the following:
   (1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

5. The method according to claim 1, wherein the method further comprises:
   receiving a CSI measurement parameter from the network device, wherein the CSI measurement parameter is configured based on the capability information.

6. An apparatus comprising at least one processor, the at least one processor is coupled to a memory storing programming instructions for execution by the at least one processor to perform operations comprising:
   transmitting capability information to a network device, wherein the capability information indicates a maximum quantity of ports of reference signals (RSs) for channel state information (CSI) measurement supported by a terminal device in a time-domain unit, wherein the time-domain unit is one slot, and wherein the capability information is determined based on a capability of the terminal device;
   receiving a CSI measurement configuration configured based on the capability information;
   receiving at least one CSI-RS based on the CSI measurement configuration; and
   transmitting CSI based on the at least one CSI-RS.

7. The apparatus according to claim 6, wherein the capability information corresponds to at least one of codebook type I or codebook type II.

8. The apparatus according to claim 6, wherein:
the capability information is indicated by using a bit in a bitmap or by using a value of an indication field.

9. The apparatus according to claim 6, wherein the maximum quantity of ports of reference signals used for CSI measurement comprises at least one of the following:
(1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

10. The apparatus according to claim 6, wherein the operations further comprising:
receiving a CSI measurement parameter configured based on the capability information.

11. The apparatus according to claim 6, wherein the apparatus is a chip or the terminal device.

12. A non-transitory computer-readable storage medium, storing one or more instructions executable by at least one processor to perform operations comprising:
transmitting capability information to a network device, wherein the capability information indicates a maximum quantity of ports of reference signals (RSs) for channel state information (CSI) measurement supported by a terminal device in a time-domain unit, wherein the time-domain unit is one slot, and wherein the capability information is determined based on a capability of the terminal device;
receiving a CSI measurement configuration configured based on the capability information;
receiving at least one CSI-RS based on the CSI measurement configuration; and
transmitting CSI based on the at least one CSI-RS.

13. The non-transitory computer-readable storage medium according to claim 12, wherein the capability information corresponds to at least one of codebook type I or codebook type II.

14. The non-transitory computer-readable storage medium according to claim 12, wherein:
the capability information is indicated by using a bit in a bitmap or by using a value of an indication field.

15. The non-transitory computer-readable storage medium according to claim 12, wherein the maximum quantity of ports of reference signals used for CSI measurement comprises at least one of the following:
(1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

16. The non-transitory computer-readable storage medium according to claim 12, wherein the operations further comprising:
receiving a CSI measurement parameter configured based on the capability information.

17. A method for capability reporting comprising:
receiving capability information from a terminal device, wherein the capability information indicates a maximum quantity of ports of reference signals (RSs) for channel state information (CSI) measurement supported by the terminal device in a time-domain unit, wherein the time-domain unit is one slot, and wherein the capability information is determined based on a capability of the terminal device;
transmitting a CSI measurement configuration configured based on the capability information; and
transmitting at least one CSI-RS based on the CSI measurement configuration for receiving CSI.

18. The method according to claim 17, wherein the capability information corresponds to at least one of codebook type I or codebook type II.

19. The method according to claim 17, wherein the capability information is indicated by using a bit in a bitmap or by using a value of an indication field.

20. The method according to claim 17, wherein the maximum quantity of ports of reference signals used for CSI measurement comprises at least one of the following:
(1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

21. The method according to claim 17, wherein the method further comprises:
transmitting a CSI measurement parameter configured based on the capability information to the terminal device.

22. An apparatus comprising at least one processor, the at least one processor is coupled to a memory storing programming instructions for execution by the at least one processor to perform operations comprising:
receiving capability information from a terminal device, wherein the capability information indicates a maximum quantity of ports of reference signals (RSs) for channel state information (CSI) measurement supported by a terminal device in a time-domain unit, wherein the time-domain unit is one slot, and wherein the capability information is determined based on a capability of the terminal device;
transmitting a CSI measurement configuration configured based on the capability information; and
transmitting at least one CSI-RS based on the CSI measurement configuration for receiving CSI.

23. The apparatus according to claim 22, wherein the capability information corresponds to at least one of codebook type I or codebook type II.

24. The apparatus according to claim 22, wherein:
the capability information is indicated by using a bit in a bitmap or by using a value of an indication field.

25. The apparatus according to claim 22, wherein the maximum quantity of ports of reference signals used for CSI measurement comprises at least one of the following:
(1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

26. The apparatus according to claim 22, wherein the operations further comprising:
   transmitting a CSI measurement parameter configured based on the capability information to the terminal device.

27. The apparatus according to claim 22, wherein the apparatus is a chip or a network device.

28. A non-transitory computer-readable storage medium, storing one or more instructions executable by at least one processor to perform operations comprising:
   receiving capability information from a terminal device, wherein the capability information indicates a maximum quantity of ports of reference signals (RSs) for channel state information (CSI) measurement supported by the terminal device in a time-domain unit, wherein the time-domain unit is one slot, and wherein the capability information is determined based on a capability of the terminal device;
   transmitting a CSI measurement configuration configured based on the capability information; and
   transmitting at least one CSI-RS based on the CSI measurement configuration for receiving CSI.

29. The non-transitory computer-readable storage medium according to claim 28, wherein the capability information corresponds to at least one of codebook type I or codebook type II.

30. The non-transitory computer-readable storage medium according to claim 28, wherein:
   the capability information is indicated by using a bit in a bitmap or by using a value of an indication field.

31. The non-transitory computer-readable storage medium according to claim 28, wherein the maximum quantity of ports of reference signals used for CSI measurement comprises at least one of the following:
   (1) a quantity of ports of reference signals used for channel measurement, (2) a sum of: the quantity of ports of the reference signals used for channel measurement and a quantity of ports of reference signals used for interference measurement, or (3) a weighted sum of: the quantity of ports of the reference signals used for channel measurement and the quantity of ports of the reference signals used for interference measurement.

32. The non-transitory computer-readable storage medium according to claim 28, wherein the operations further comprising:
   transmitting a CSI measurement parameter configured based on the capability information to the terminal device.

\* \* \* \* \*